US011810217B2

(12) United States Patent
Li et al.

(10) Patent No.: US 11,810,217 B2
(45) Date of Patent: Nov. 7, 2023

(54) METHOD AND SYSTEM FOR TRIP INVITATION

(71) Applicant: Ford Global Technologies, LLC, Dearborn, MI (US)

(72) Inventors: Yifei Li, Shanghai (CN); Heng Fan, Shanghai (CN)

(73) Assignee: Ford Global Technologies, LLC, Dearborn, MI (US)

( * ) Notice: Subject to any disclaimer, the term of this patent is extended or adjusted under 35 U.S.C. 154(b) by 549 days.

(21) Appl. No.: 16/799,341

(22) Filed: Feb. 24, 2020

(65) Prior Publication Data

US 2020/0273136 A1 Aug. 27, 2020

(30) Foreign Application Priority Data

Feb. 25, 2019 (CN) .......................... 201910139076.5

(51) Int. Cl.
| | |
|---|---|
| *G06Q 50/30* | (2012.01) |
| *G06F 16/23* | (2019.01) |
| *G06Q 50/00* | (2012.01) |
| *H04W 4/024* | (2018.01) |
| *G01C 21/36* | (2006.01) |
| *H04W 4/40* | (2018.01) |
| *H04W 4/14* | (2009.01) |
| *G01C 21/34* | (2006.01) |

(52) U.S. Cl.
CPC ......... *G06Q 50/30* (2013.01); *G01C 21/3438* (2013.01); *G01C 21/36* (2013.01); *G06F 16/2379* (2019.01); *G06Q 50/01* (2013.01); *H04W 4/024* (2018.02); *H04W 4/14* (2013.01); *H04W 4/40* (2018.02)

(58) Field of Classification Search
CPC .... G06Q 50/30; G06Q 50/01; G06Q 30/0605; G06Q 30/0639; G01C 21/3438; G01C 21/36; G01C 21/3415; G06F 16/2379; H04W 4/024; H04W 4/14; H04W 4/40; H04W 4/44; H04W 4/35
See application file for complete search history.

(56) References Cited

U.S. PATENT DOCUMENTS

| | | | |
|---|---|---|---|
| 9,042,919 B2 * | 5/2015 | Trussel ................. | H04W 4/023 455/457 |
| 9,092,400 B1 * | 7/2015 | Lin ....................... | G06F 40/295 |
| 9,125,020 B2 * | 9/2015 | Banasky, Jr. ........... | H04W 4/46 |
| 11,074,526 B1 * | 7/2021 | Gormley ................ | G06Q 50/30 |
| 11,079,995 B1 * | 8/2021 | Hulbert ................. | G06F 3/0485 |
| 11,144,868 B1 * | 10/2021 | McBride ............ | G06Q 10/0834 |

(Continued)

*Primary Examiner* — David P Zarka
*Assistant Examiner* — Wuji Chen
(74) *Attorney, Agent, or Firm* — Brandon Hicks; Eversheds Sutherland (US) LLP

(57) ABSTRACT

One or a plurality of embodiments of the present application provide a system applicable for trip invitation, the system comprising: a server side, comprising a computer-readable storage medium having executable instructions, and a processor communicating with the computer-readable storage medium, wherein the executable instructions are configured to, when executed, cause the processor to: acquire a trip invitation of a first client directed to a second client, wherein the trip invitation comprises identification information of the first client and a location sharing request; and send the trip invitation to the second client.

13 Claims, 15 Drawing Sheets

(56) References Cited

U.S. PATENT DOCUMENTS

| | | | | |
|---|---|---|---|---|
| 11,164,269 B1* | 11/2021 | Locke | | H04W 4/024 |
| 2008/0016442 A1* | 1/2008 | Khoo | | G06Q 99/00 |
| | | | | 715/700 |
| 2008/0312826 A1* | 12/2008 | Shahrestani | | G01C 21/3611 |
| | | | | 701/533 |
| 2010/0017237 A1* | 1/2010 | Dalesandro | | G06Q 30/0601 |
| | | | | 715/764 |
| 2010/0114626 A1* | 5/2010 | Piccinini | | G06Q 99/00 |
| | | | | 705/500 |
| 2011/0166950 A1* | 7/2011 | Goldstein | | G06Q 10/02 |
| | | | | 705/26.3 |
| 2011/0246404 A1* | 10/2011 | Lehmann | | G06Q 50/14 |
| | | | | 706/21 |
| 2011/0282700 A1* | 11/2011 | Cockcroft | | G06Q 30/06 |
| | | | | 709/205 |
| 2011/0300894 A1* | 12/2011 | Roberts, Sr. | | G06Q 10/08 |
| | | | | 370/352 |
| 2014/0108066 A1* | 4/2014 | Lam | | G06Q 10/10 |
| | | | | 705/5 |
| 2014/0189888 A1* | 7/2014 | Madhok | | H04L 63/102 |
| | | | | 726/29 |
| 2014/0222328 A1* | 8/2014 | Baca | | H04W 4/023 |
| | | | | 701/410 |
| 2014/0237420 A1* | 8/2014 | Song | | G06F 3/04817 |
| | | | | 715/788 |
| 2014/0280580 A1* | 9/2014 | Langlois | | B60K 37/06 |
| | | | | 709/204 |
| 2014/0282040 A1* | 9/2014 | Alfaro | | G06F 3/04847 |
| | | | | 715/739 |
| 2015/0012341 A1* | 1/2015 | Amin | | G07B 15/00 |
| | | | | 705/13 |
| 2015/0012830 A1* | 1/2015 | Choi | | G06F 3/04842 |
| | | | | 715/765 |
| 2015/0066606 A1* | 3/2015 | Smirin | | G06Q 20/18 |
| | | | | 705/13 |
| 2015/0172393 A1* | 6/2015 | Oplinger | | H04L 67/52 |
| | | | | 709/204 |
| 2016/0073233 A1* | 3/2016 | Wilcox | | H04W 4/021 |
| | | | | 455/414.3 |
| 2016/0091332 A1* | 3/2016 | Chang | | G06T 11/60 |
| | | | | 701/410 |
| 2016/0117610 A1* | 4/2016 | Ikeda | | G06Q 10/02 |
| | | | | 705/5 |
| 2016/0132983 A1* | 5/2016 | Qin | | G06F 3/04883 |
| | | | | 715/733 |
| 2016/0171011 A1* | 6/2016 | Drogobetski | | G06F 3/04842 |
| | | | | 707/722 |
| 2016/0255030 A1* | 9/2016 | Shoihat | | G06F 3/04883 |
| | | | | 709/206 |
| 2016/0292596 A1* | 10/2016 | Gaitan | | G06Q 10/101 |
| 2016/0334232 A1* | 11/2016 | Zhuang | | G06Q 10/02 |
| 2016/0356615 A1* | 12/2016 | Arata | | G01C 21/3438 |
| 2016/0360336 A1* | 12/2016 | Gross | | H04W 4/025 |
| 2016/0364679 A1* | 12/2016 | Cao | | G06Q 50/30 |
| 2017/0011348 A1* | 1/2017 | Ziskind | | H04W 4/021 |
| 2017/0048686 A1* | 2/2017 | Chang | | H04W 52/0209 |
| 2017/0061561 A1* | 3/2017 | Cha | | H04W 4/025 |
| 2017/0123421 A1* | 5/2017 | Kentley | | G05D 1/0287 |
| 2017/0169366 A1* | 6/2017 | Klein | | G06Q 10/047 |
| 2018/0088764 A1* | 3/2018 | Lu | | G06F 3/0486 |
| 2018/0180425 A1* | 6/2018 | Hennessy | | G01C 21/206 |
| 2019/0019146 A1* | 1/2019 | Chraibi | | G08G 1/202 |
| 2019/0050092 A1* | 2/2019 | Yamashita | | G06Q 50/30 |
| 2019/0138564 A1* | 5/2019 | Lu | | G06F 16/9558 |
| 2019/0171798 A1* | 6/2019 | Boghossian | | G06F 21/31 |
| 2019/0172353 A1* | 6/2019 | Chen | | H04W 4/029 |
| 2019/0204992 A1* | 7/2019 | Bowden | | G06F 3/0482 |
| 2019/0205854 A1* | 7/2019 | Baren | | G07F 9/002 |
| 2019/0212163 A1* | 7/2019 | Li | | G01C 21/32 |
| 2019/0272589 A1* | 9/2019 | Simpson | | G06F 16/9038 |
| 2019/0295142 A1* | 9/2019 | Paulucci | | G06Q 50/30 |
| 2019/0320310 A1* | 10/2019 | Horelik | | H04W 4/90 |
| 2020/0104965 A1* | 4/2020 | Ramot | | G06Q 30/0621 |
| 2020/0134562 A1* | 4/2020 | Sperau | | G06Q 30/04 |
| 2020/0273136 A1* | 8/2020 | Li | | H04W 4/14 |
| 2020/0334581 A1* | 10/2020 | Skaling | | H04W 12/77 |
| 2020/0349666 A1* | 11/2020 | Hodge | | G08G 1/017 |
| 2020/0382908 A1* | 12/2020 | Behzadi | | H04W 68/00 |
| 2020/0410405 A1* | 12/2020 | ElShenawy | | G06Q 50/30 |
| 2020/0410555 A1* | 12/2020 | ElShenawy | | G06Q 30/0282 |
| 2021/0248911 A1* | 8/2021 | Shimodaira | | G06Q 50/30 |
| 2021/0304086 A1* | 9/2021 | Mehta | | G06Q 10/02 |
| 2022/0067605 A1* | 3/2022 | Zhang | | G06Q 10/06311 |
| 2022/0082394 A1* | 3/2022 | Radakovic | | G01C 21/3438 |
| 2022/0092484 A1* | 3/2022 | Fernandes | | G06Q 50/30 |
| 2022/0236790 A1* | 7/2022 | Sun | | G06F 3/0346 |
| 2022/0269405 A1* | 8/2022 | Wu | | G06F 3/0482 |
| 2022/0413671 A1* | 12/2022 | Liu | | G06F 3/04812 |
| 2023/0164727 A1* | 5/2023 | Wei | | H04W 4/50 |
| | | | | 455/435.1 |
| 2023/0176723 A1* | 6/2023 | Zhu | | G06F 3/0488 |
| | | | | 715/781 |

* cited by examiner

METHOD AND SYSTEM FOR TRIP INVITATION

CROSS-REFERENCE TO RELATED APPLICATIONS

The present application claims priority to and the benefit of CN Application No. 201910139076.5, filed Feb. 25, 2019, which is hereby incorporated by reference herein in its entirety.

FIELD

The present application relates to a method and system for vehicle trip invitation, and in particular, to a method and system for convenient point-to-point trip invitation.

BACKGROUND

Following the development of science and technology, people can more conveniently select travel services. Various car-hailing platforms have been widely used, and vehicle trip sharing such as carpooling and ride sharing have gained widespread acceptance among those who use such services.

Current platform provide travel services can provide great convenience for users. Generally, a user places a demand order that is received by the platform. The order is then dispatched in various manners by the platform to complete the transaction. One or a plurality of users may also complete a carpooling transaction through a platform. For example, Patent Application CN107169815A "METHOD AND APPARATUS FOR CARPOOLING BETWEEN ACQUAINTANCES" has disclosed a method and apparatus for carpooling between acquaintances, including: if information of a destination address and an origin address provided by a user is received, then displaying an address book contacts window in current user equipment; and after receiving at least one contact identifier selected by the user, sending a carpooling request to a server, the carpooling request including: the destination address of the current user equipment, the origin address of the current user equipment, the at least one contact identifier, and/or a starting time.

However, the platforms provided in the prior art have difficulty in meeting the demands of car owners with respect to actively inviting others to share addresses for pick-up and drop-off, and quickly and directly planning trip routes.

SUMMARY

The above and other advantages and features of the present application will become apparent by referring to the following detailed description of embodiments only or in combination with the accompanying drawings.

According to one aspect of the present application, a system applicable for trip invitation is provided. The system may comprise: a server side, comprising a computer-readable storage medium having executable instructions, and a processor communicating with the computer-readable storage medium, wherein the executable instructions are configured to, when executed, cause the processor to perform the following steps: acquiring a trip invitation from a first client directed to a second client, wherein the trip invitation comprises identification information of the first client and a geographical location sharing request directed to the second client; and sending the trip invitation to the second client. General taxi-hailing software or trip sharing platforms usually require both parties to use the same software/application and to communicate in and operate through the specific software. The solution provided in the present application is different in that car owners and passengers are not required to use the same software platform in order to successfully locate, pick-up, and drop-off passengers. Furthermore, unlike the general real-time location sharing in software, the technical solution provided in the present application also does not require both parties to use the same location sharing software in order to conveniently communicate information of both parties, i.e., the vehicle and the passenger.

In an embodiment, the geographical location sharing request comprises a link to a server-side map.

In another embodiment, the link is an HTML link.

In yet another embodiment, the step further comprises, in response to the second client accepting the trip invitation, synchronizing a geographical location of the second client to the server-side map and further sending the geographical location to the first client.

In yet another embodiment, the step further comprises, in response to the second client accepting the trip invitation, receiving a geographical location of the second client and sending the geographical location of the second client to the first client.

In yet another embodiment, the step further comprises planning a travel route according to the geographical location of the second client.

In yet another embodiment, the step of planning a travel route according to the geographical location of the second client is implemented in the first client.

In yet another embodiment, the step comprises, when the second client refuses the invitation, sending a refusal prompt to the first client.

In yet another embodiment, the step comprises displaying a trip invitation option associated with address book contacts in the first client.

In yet another embodiment, the step comprises displaying a trip invitation option associated with contacts in the first client in a call interface of the first client.

In yet another embodiment, the step comprises displaying a trip invitation option in a map interface of a first application of the first client, and synchronizing address book contacts to the first application in response to receiving user authorization, and sending the trip invitation to the specific contact in the map interface of the first application.

In yet another embodiment, the step comprises not synchronizing address book contacts to the first application in response to receiving the user's refusal to authorize address book synchronization, and sending the trip invitation directed to the specific contact through the user inputting a contact number.

In yet another embodiment, the step comprises receiving an input from the second client to receive a new pick-up location of the second client.

In yet another embodiment, the step comprises, upon receiving an input from the second client, sending to the second client an inquiry option on whether to relocate the pick-up location of the second client, and when the second client confirms relocation, receiving a new pick-up location of the second client.

In yet another embodiment, the step comprises displaying update of the pick-up location to the first client and asking the first client whether to accept update of the pick-up location, and when the first client makes confirmation, determining the new pick-up location as the target location.

In yet another embodiment, the step comprises receiving an input from the first client to accept a new pick-up location suggested by the first client.

In yet another embodiment, the step comprises, upon receiving an input from the first client, sending to the first client an inquiry option on whether to suggest a new pick-up location, and when the first client confirms suggestion of the new pick-up location, locating the new pick-up location of the first client.

In yet another embodiment, the step comprises displaying the new pick-up location to the second client and asking the second client whether to accept the new pick-up location, and when the second client makes confirmation, the processor being configured to determine the new pick-up location as a target location.

In yet another embodiment, the step comprises further planning a travel route according to the target location.

In yet another embodiment, the step of further planning a travel route according to the target location is implemented in the first client.

In yet another embodiment, the first client is a vehicle personnel client, and the step comprises synchronizing an electronic map displayed in the vehicle personnel client with the server-side map in real time.

In yet another embodiment, the geographical location sharing request directed to the second client is a mutual geographical location sharing request, and the step comprises, in response to the second client accepting the trip invitation, mutually sharing of geographical location between the first client and the second client.

In yet another embodiment, the step comprises, in response to the second client accepting the trip invitation, sending the geographical location and a destination of the second client to the first client.

In yet another embodiment, the step comprises, in response to the second client accepting the trip invitation, receiving the geographical location and the destination sent by the second client and planning a route based on the geographical location and the destination.

According to another aspect of the present application, a system for trip invitation is provided. The system may comprise: a first client, comprising a computer-readable storage medium having executable instructions, and a processor communicating with the computer-readable storage medium, wherein the executable instructions are configured to, when executed, cause the processor to perform the following steps: acquiring a user input to send a trip invitation directed to a second client, wherein the trip invitation comprises identification information of the first client and a geographical location sharing request directed to a second client; and sending the trip invitation to the second client in a short message form; and in response to the second client accepting the trip invitation, receiving a geographical location sent by the second client.

In an embodiment, the geographical location sharing request comprises an HTML link.

In another embodiment, the step comprises receiving, by the first client, the geographical location sent in the short message form or another form of instant messaging from the second client.

In yet another embodiment, the step comprises further interpreting the geographical location and marking the geographical location onto a map interface of the first client and performing route planning.

According to yet another aspect of the present application, an apparatus for trip invitation is provided. The apparatus may comprise: a computer-readable storage medium having executable instructions, and a processor communicating with the computer-readable storage medium. The executable instructions are configured to, when executed, cause the processor to perform the following step: acquiring a user input, and sending a trip invitation to a specific contact according to the specific contact selected by a user, wherein the trip invitation comprises identification information of the user and a geographical location sharing request directed to the specific contact.

In an embodiment, the geographical location sharing request comprises a link to a server-side map.

In another embodiment, the step comprises sending the trip invitation in a short message form. In some other examples, the trip invitation may be sent in any appropriate instant messaging manner.

In yet another embodiment, the step comprises displaying a trip invitation option associated with contacts in the apparatus.

In yet another embodiment, the step comprises displaying a trip invitation option associated with the specific contact in a call interface.

In yet another embodiment, the step comprises displaying a trip invitation option located in a map interface of a first application, and synchronizing address book contacts to the first application in response to receiving user authorization, and sending the trip invitation to the specific contact in the map interface of the first application.

In yet another embodiment, the step comprises not synchronizing address book contacts to the first application in response to receiving the user's refusal to authorize address book synchronization, and sending the trip invitation directed to the specific contact through the user inputting a contact number.

In yet another embodiment, the first client is a vehicle personnel portable mobile terminal or a vehicle computer terminal.

In yet another embodiment, the trip invitation is a ride invitation or a pick-up request directed to the second client.

In yet another embodiment, the step comprises displaying a quick call option in the map interface of the first application.

In yet another embodiment, the step comprises receiving a photo sent by the specific contact and displaying the photo in a map interface of the first client.

According to yet another aspect of the present application, a system applicable for trip invitation is provided. The system may comprise: a server side, comprising a computer-readable storage medium having executable instructions, and a processor communicating with the computer-readable storage medium. The executable instructions are configured to, when executed, cause the processor to: acquire a trip invitation from a first client directed to a second client, wherein the trip invitation comprises identification information of the first client and a pick-up request directed to the second client; and send the trip invitation to the second client, wherein the first client is a passenger side, and the second client is a vehicle personnel side.

In an embodiment, the trip invitation further comprises a link to a server-side map.

In another embodiment, the trip invitation further comprises a geographical location of the first client.

In yet another embodiment, the step comprises, in response to the second client accepting the trip invitation, synchronizing the geographical location of the first client to the server-side map and further sending the geographical location to the first client.

In yet another embodiment, the step comprises, in response to the second client accepting the trip invitation, receiving the geographical location of the first client and sending the geographical location of the first client to the second client.

In yet another embodiment, the step comprises planning a travel route according to the geographical location of the first client.

In yet another embodiment, the step comprises planning the travel route by setting the geographical location of the first client as a target location.

In yet another embodiment, the step comprises, when the second client refuses the invitation, the processor being configured to send a refusal prompt to the first client.

In yet another embodiment, the step comprises displaying a trip invitation option associated with address book contacts in the first client.

In yet another embodiment, the step comprises displaying trip invitation options associated with contacts in the first client in a call interface.

According to yet another aspect of the present invention, a method for trip invitation is provided. The method may comprise: sending a trip invitation to a second client through a first client, wherein the trip invitation comprises a geographical location sharing request directed to the second client; and receiving feedback of the second client through the first client, wherein when the second client accepts the trip invitation, the second client sends a geographical location thereof to the first client.

In an embodiment, the location sharing request comprises a link to an electronic map, and the geographical location of the second client is sent to the first client in the form of a marker on the map.

In another embodiment, the location sharing request comprises a text request, and the geographical location feedback comprises at least one component from the group consisting of a picture, and latitude data and longitude data.

In yet another embodiment, the location sharing request comprises a link to an electronic map of a server, and the geographical location feedback is synchronized to a server network in the form of a marker on the map and is further sent to the first client. In yet another embodiment, when the second client refuses the trip invitation, a refusal message is sent to the first client.

According to yet another aspect of the present application, a device comprising a navigation application is provided. The device comprising the navigation application may comprise: a computer-readable storage medium having executable instructions, and a processor communicating with the computer-readable storage medium. The executable instructions are configured to, when executed, cause the processor to perform the following steps: acquiring an input of a user in a navigation interface, and sending a trip invitation to a specific contact according to the specific contact selected by the user, wherein the trip invitation may comprise identification information of the user and a geographical location sharing request directed to the specific contact.

In an embodiment, the geographical location sharing request comprises a link to a server-side map, and the trip invitation may be sent through a short message or another form of instant messaging.

In another embodiment, the step may comprise displaying a trip invitation option in the navigation interface, synchronizing address book contacts to the navigation application in response to receiving user authorization, and sending the trip invitation to the specific contact in the navigation interface.

In yet another embodiment, the step comprises not synchronizing address book contacts to the navigation application in response to receiving the user's refusal to authorize address book synchronization, and sending the trip invitation directed to the specific contact through the user inputting a contact number.

In yet another embodiment, the step further comprises displaying a quick call option in the navigation interface of the navigation application.

In yet another embodiment, the step further comprises receiving a photo sent by the specific contact and displaying the photo in the navigation interface.

In yet another embodiment, the step further comprises, in response to the specific contact accepting the trip invitation, receiving a geographical location of the specific contact and planning a route. In some other embodiments, the step further comprises receiving a geographical location and a destination of the specific contact in response to the specific contact accepting the trip invitation, and planning a route based on the geographical location and the destination of the specific contact.

BRIEF DESCRIPTION OF THE DRAWINGS

In order to understand the embodiments of the present application more fully, reference should be made to more detailed illustration for the accompanying drawings and embodiments described below through examples, where.

DETAILED DESCRIPTION

Figure 1:
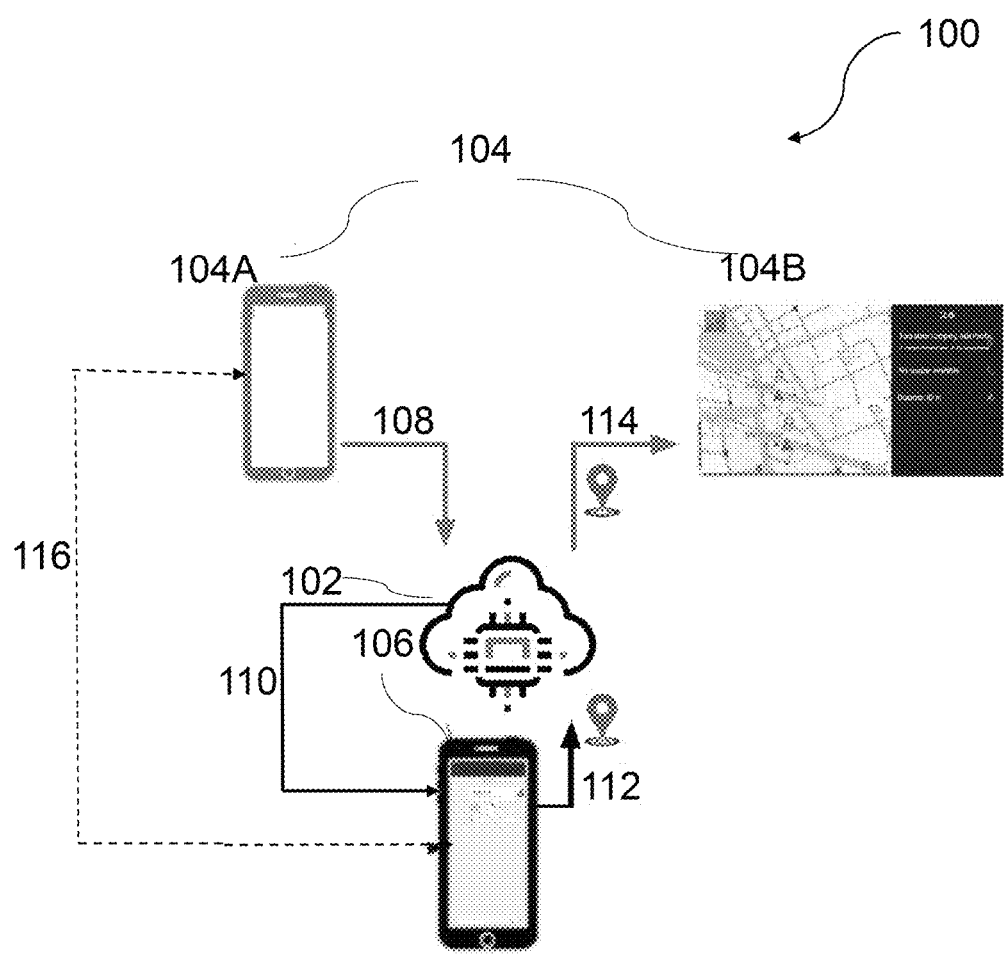
FIG. 1 shows an interaction example of a system for vehicle trip invitation according to an embodiment.

For reference numerals in the drawings, the same or similar reference numerals are used to indicate the same or similar components. In the description below, a plurality of operation parameters and components are described in a plurality of embodiments. These specific parameters and components are included herein as examples only and are not meant to be limiting.

Detailed embodiments of the present application are disclosed herein as required; however, it should be understood that the disclosed embodiments are only examples of the present application, and the present disclosure may be implemented in various alternative forms. The drawings are not necessarily drawn to scale. Some features may be enlarged or minimized to show details of specific components. Therefore, specific structural and functional details disclosed herein should not be construed as limiting; instead, they are merely a representative basis for teaching those skilled in the art to utilize the present disclosure in various manners.

As mentioned in the Background, following the development of science and technology, current platforms providing travel services offer greater convenience for users. In the general operation of such technology, upon receiving a demand order placed by a user, a platform receives the demand order and dispatches the order in various manners to complete the transaction. One or a plurality of users may also complete a carpooling transaction through a platform and share the fare to save costs. However, the inventor of the present application realizes that various platforms mentioned above are all based on transaction completion and do not provide convenience to car owners when picking up acquaintances. In addition, the use of the aforementioned platforms requires the driver and the rider to both use the same platform, and thus cannot provide convenience to users who have not installed the same application. In a scenario where a car owner has to pick up elderly persons (e.g. one's parents or grandparents), the person needing a ride may be unfamiliar with new applications or may not know how to clearly express the location. Consequently, the car owner will need to make many phone calls to communicate the location, which is quite inconvenient and compromises road safety. In view of the one or plurality of problems in the prior art, the inventor of the present application provides an apparatus, system, and method for trip invitation in one or a plurality of embodiments. The inventor believes that one or plurality of problems in the prior art can thereby be solved. The trip invitation may refer to a trip invitation, a ride invitation, a pick-up request, or an invitation initiated by one party to the other specific party.

One or a plurality of embodiments of the present application will be described below with reference to the drawings. A flowchart illustrates the process performed by a system. It can be understood that the execution in the flowchart does not need to be performed in order, where one or a plurality of steps may be omitted, one or a plurality of steps may be added, and one or a plurality of steps may be performed in order or in reverse order and even performed simultaneously in some embodiments.

The following embodiments may involve the "first client," "second client," "car owner," and "passenger," which are used for illustrating the interaction between both parties involved in a trip invitation in one or a plurality of embodiments, and are interchangeable in some cases without departing from the spirit of the present application.

The vehicle involved in the following embodiments may include various types of passenger vehicles (such as crossover utility vehicles (CUVs) and sports utility vehicles (SUVs)), buses, trucks, recreational vehicles (RVs), boats, planes or other mobile machines for carrying people or goods, and a combination thereof.

The positioning technology involved in the present application may include, but is not limited to, positioning technologies such as the Global Positioning System (GPS), Global Navigation Satellite System, Wireless Fidelity Positioning System, Compass Navigation System, and a combination thereof.

FIG. 1 shows an example of client interaction in a system 100 for trip invitation in one or a plurality of embodiments. As shown in the figure, in an embodiment, a system 100 applicable for trip invitation is provided. The system 100 may include a server side 102 and a first client 104 communicating with the server side 102. The first client 104 may include, for example, a mobile phone 104A, a vehicle computer system/vehicle computer 104B, and a second client 106 communicating with the server side 102. The server side 102 may regularly have a computer-readable storage medium and a processor so as to store data instructions and process data. It can be understood that the "server" or "server side" involved here or in other places of the present application may be a device providing a computer service, or a physical or virtual computer terminal responding to a service request and capable of performing processing. It may include a real physical device, or may include a cloud server performing computations on a cloud platform. The cloud platform may include a private cloud, a public cloud, a hybrid cloud, a community cloud, an industry cloud, and a middle cloud. The server or server side in the present application does not have a specific reference and may be a mixture of one or more of the foregoing, as long as required communication storage and computing services can be provided. The aforementioned first client 104 and second client 106 may be any form of mobile device or roaming device. In an embodiment, the first client 104 may be a car owner side, a driver side, or a vehicle-side passenger (which may be collectively called a vehicle personnel side in some embodiments), and the second client 106 may be a passenger side. The vehicle personnel side may specifically include many forms of terminals, such as a mobile phone, a vehicle computer system (VCS) (for example, a VCS 1 described below with reference to FIG. 2), a vehicle navigation device (for example, a vehicle computer navigation device 60 or a personal navigation device 54 described below with reference to FIG. 2), and the like. The passenger side 106 may also include a portable device such as a mobile phone.

Still referring to FIG. 1, in the information flow direction indicated by the arrow 108, the server side 102 may acquire a trip invitation of the first client 104 (for example, 104A shown in the figure; it can be understood that 104B or other forms of first clients 104 all can initiate a trip invitation) through a network. Unlike general software platforms for trip sharing, the trip invitation sent by the first client 104 initiates a trip invitation to the specific second client 106, rather than initiating a trip or route that is visible to any person in the platform and available for any person to optionally respond. The second client 106 or the passenger side may receive the trip invitation through the mobile device 106 such as a mobile phone. In the information flow direction indicated by the arrow 110, the server side 102 may further send the trip invitation in, for example, an instant messaging form such as a short message, to the second client 106 shown in the figure. When the second client 106 accepts the trip invitation, a geographical location of the second client 106 indicated by the arrow 112 may be synchronized to the server side 102. Further, as indicated by the arrow 114, the first client 104 may receive, from the server side 102, synchronized information of a map indicating the geographical location of the second client 106, so as to determine the location of the second client 106 and subsequently plan a route. FIG. 1 schematically shows that the geographical location is received by the vehicle computer 104B. Those skilled in the art can understand and can completely use the mobile phone 104A or other vehicle personnel apparatuses to receive the geographical location and perform navigation. Or, in some cases, the first client 104A and the vehicle computer 104B may be interconnected in any feasible manner, so that either of them can receive the geographical location of the second client 106 and perform route planning and navigation. The route planning may be implemented in the server side 102 or may be implemented in the first client 104. Certainly, the server side 102 or the first client 104 may accordingly include a memory and instructions as well as a processor to implement route calculation and optimization.

In addition, those skilled in the art can understand that in one or a plurality of embodiments, the first client and/or the second client, whether a mobile phone side or a vehicle computer side, both can be installed with a navigation application, where the navigation application may be a separate application, or may include a navigation function embedded in other applications, which is not particularly limited herein. Here or in other places, the term "map interface" or "navigation interface" may be used alternately to indicate entry into a map page that can guide routes for users.

In the embodiment shown in FIG. 1, the first client 104 and the second client 106 implement sending of the trip invitation and confirmation of the geographical location through the server 102, where the trip invitation may include a link or a website linked to a server-side map. The object linked by the link or the website is visible to both the first client 104 and the second client 106. Certainly, in some other embodiments, the object linked by the link or the website may only be visible to the first client 104. In one or a plurality of embodiments, the first client 104 may access an online or offline electronic map, where the electronic map may be synchronized in real time or selectively with the map of the server side 102. The term "send" here or in other places may broadly include propagating a message through an appropriate network. In one or a plurality of embodiments, the meaning of sending includes synchronization. In addition, the server-side map may refer to an electronic map stored in the server device mentioned above in an appropriate manner. In this embodiment, subsequent route calculation may be implemented by the first client 104 itself or the server 102.

In some embodiments, the interaction between the first client 104 and the second client 106 may be directly implemented through a network. For example, the first client 104 may send a trip invitation including a network link to the second client 106, and the first client 104 may also access the network link and view the status of acceptance of the second client 106 in real time and share a real-time location thereto. In other words, mutual locating and location sharing can be implemented through the network electronic map. Certainly, in this implementation, the backend of the electronic map associated with the network link needs to provide relevant authorization allocation and management units to ensure that the first client 104 and the second client 106 can have appropriate authorization to mutually view each other's location without affecting the use by others.

Although the aforementioned embodiment shows that the first client 104 and the second client 106 interact through the server 102 and implement location confirmation and interaction through the map stored in the server side 102, in another embodiment, as indicated by the dashed line 116, the first client 104 and the second client 106 may also interact with each other more directly without using the map of the server side. In this embodiment, the system 100 for trip invitation may also include the first client 104 and the second client 106. The first client 104 may similarly include a computer-readable storage medium having executable instructions, and a processor communicating with the computer-readable storage medium. The executable instructions may be configured to, when executed, cause the processor to: acquire an input of a user in the first client 104 and initiate a trip invitation directed to the second client 106. The trip invitation includes identification information of the first client and a geographical location sharing request directed to the second client 106. The geographical location sharing request may be a text, a link, or any other appropriate form. The geographical location sharing request is requesting the second client 106 to feed back the geographical location thereof in an appropriate manner. In one or a plurality of embodiments, the "geographical location sharing request" may refer to a request from one party, e.g., the first client 104, to the other party, e.g., the second client 106, where the second client 106 is requested to share the geographical location of the second client 106. In this process, the first client 104 may not open up or share a geographical location of the first client 104 itself to the second client 106. In some other embodiments, the "geographical location sharing request" may be a "mutual geographical location sharing request." The "mutual geographical location sharing request" may include sharing the geographical location of the first client 104 itself generally at the same time when requesting the second client 106 to share the location thereof. This allows the first client 104 and the second client 106 to see each other's location after location sharing, and further learn about real-time location changes. In this embodiment, the trip invitation may be sent to the second client 106 in any appropriate form such as a short message, a We Chat message, or a message through an instant messaging application installed in a mobile terminal. The short message may include a mobile phone number of the inviter and an inquiry on whether to agree to share the location. As indicated by the two-way arrow 116, the second client 106 may feed or send the geographical location back to the first client 104 by direct feedback.

In one or a plurality of embodiments, the feedback of the geographical location may include many manners. In addition to marking the geographical location through a network link mentioned in the aforementioned embodiment, other feasible manners may also be adopted. As mentioned above, the positioning technology for the first client 104 and the second client 106 may include, but is not limited to, positioning technologies such as GPS, Global Navigation Satellite System, Wireless Fidelity Positioning System, and Compass Navigation System and a combination thereof. In an embodiment, the second client 106 can identify its own geographical location (like the prior art in which the geographical location can be identified through a portable mobile device, the specific principles of which will not be described herein again), and send the geographical location in the form of a data short message to the first client 104 using latitude and longitude or other methods for representing a location. The first client 104 accordingly includes a processor configured to interpret received data information as a geographical location and mark the geographical location onto a map interface of the first client 104.

In yet some embodiments, the second client 106 further sends a photo from which the location can be identified to the first client 104 using a hardware or software device included therein. For example, in a scenario, the second client 106 may take or select, through a network, a photo having an iconic building or environment nearby, so that the first client 104 can perform comparison and matching between the photo and the real map scene and further identify the location of the second client 106, or identify the location of the iconic building in other manners. In other embodiments, the location of the second client 106 may be further determined by identifying signals such as Bluetooth or a near field communication apparatus. Only some feasible implementations are listed above, and those skilled in the art can anticipate many variations, as long as the geographical location can be shared. Such embodiments of direct interaction are favorable in application scenarios having undesirable network coverage, especially those without 4G or 5G network coverage or having poor network conditions. In this way, the application of this solution neither requires the second client 106 to be installed with specific software corresponding to the first client 104, nor requires the second client 106 to capable of opening the network link and locating the geographical location to the server map as in the aforementioned embodiment. In addition, in the case that the first client 104 uses an offline map, the first client 104 does not maintain map synchronization with the server 102. Thus, direct information exchange between the first client 104 and the second client 106 provides convenience to implementation of the aforementioned solution. Subsequent route calculation of the first client 104 may be implemented in the mobile phone or the vehicle computer.

In addition, those skilled in the art can understand that in one or a plurality of embodiments, the trip invitation sent by the first client 104 may further include requesting the second client 106 to share a geographical location thereof and a destination thereof, and when the second client 106 accepts the trip invitation, a current geographical location/pick-up location of the second client 106 is sent to the first client 104, and a desired destination of the second client 106 may also be sent to the first client 104, where the destination of the second client 106 may be sent simultaneously with or in a different step from that of the current geographical location/pick-up location of the second client 106. For example, in an embodiment, the current geographical location and the destination of the second client 106 are displayed in a path form in the map interface/navigation interface of the first client 104, and the first client 104 may set the geographical location of the second client 106 as a way point and use the destination of the second client 106 as a travel destination. In another embodiment, the first client 104 may also use both the geographical location and the destination of the second client 106 as way points for navigation.

An example of interaction between a vehicle computer system (VCS) and a roaming device, a mobile device, a network, or the like will be introduced below with reference to FIG. 2 as an example.

Figure 2:
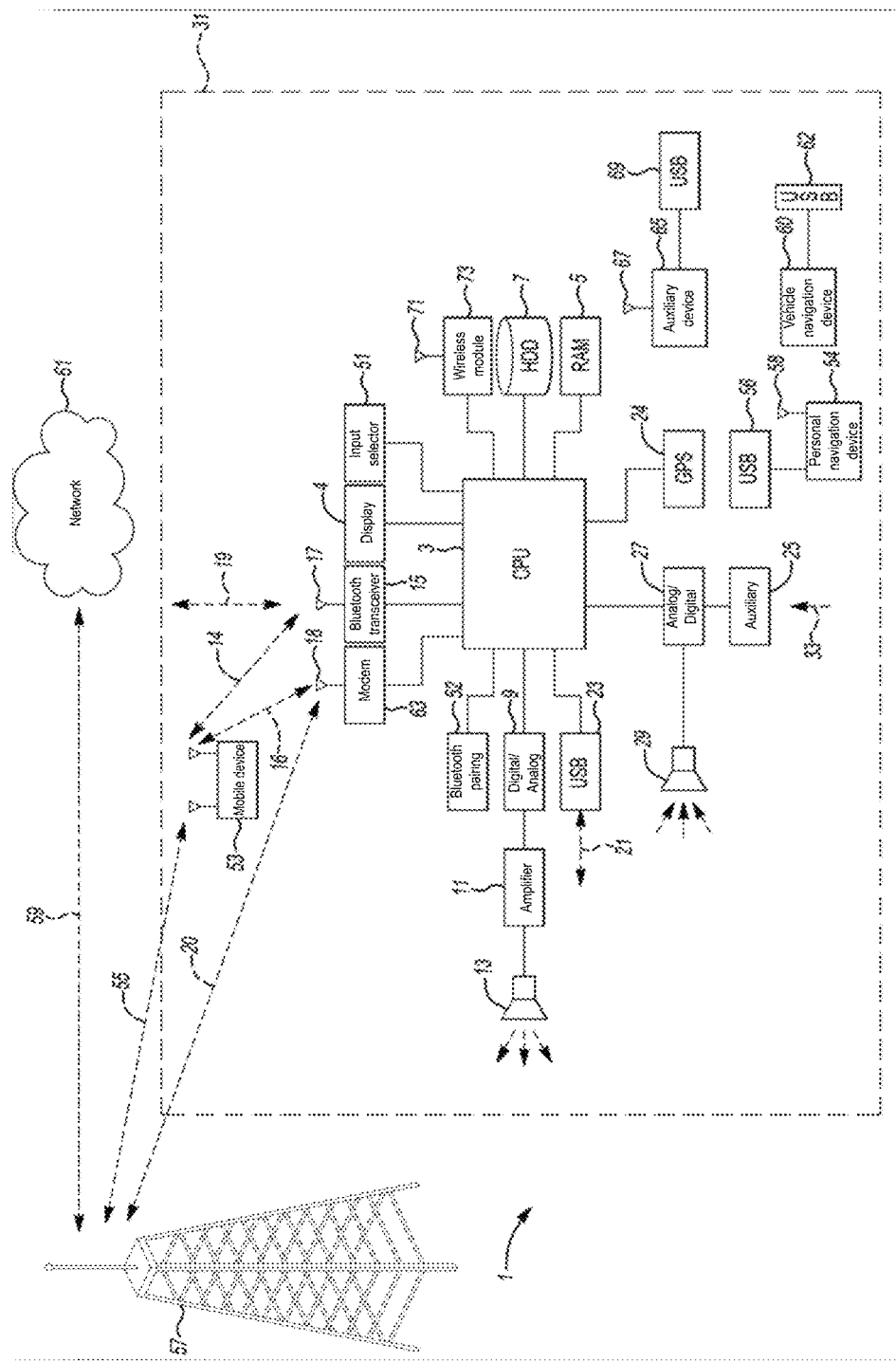
FIG. 2 shows an exemplary block topology diagram of a vehicle computer system (VCS) 1 for a vehicle 31.

FIG. 2 illustrates an exemplary block topology diagram of a vehicle computer system (VCS) 1 for a vehicle 31. Such a vehicle-based computer system 1 may be, for example, the SYNC system manufactured by Ford Motor Company, or other information entertainment systems developed by any other company. It can be understood that a vehicle of the aforementioned SYNC system (or other information entertainment systems) provided with the vehicle-based computer system may include a visual front-end interface 4 located in the vehicle. A user may further interact with the interface (if provided) through a touch screen. In another illustrative embodiment, interaction is performed through button presses, spoken dialog, and voice synthesis. Voice interaction in one or a plurality of embodiments of the present application may be implemented through the aforementioned vehicle computer system (VCS) or based on a cloud computer system.

In the illustrative embodiment 1 shown in FIG. 2, a processor 3 controls at least part of the operation of the vehicle computer system. The processor provided in the vehicle allows on-board processing of instructions and programs. In addition, the processor 3 is connected to a non-persistent memory 5 and a persistent memory 7. In this illustrative embodiment, the non-persistent memory is a random access memory (RAM), and the persistent memory is a hard disk drive (HDD) or a flash memory.

The processor is further provided with a plurality of different inputs that allow the user to interact with the processor. In this illustrative embodiment, a microphone 29, an auxiliary input 25 (for an input 33), a USB input 23, a GPS input 24, and a Bluetooth input 15 are provided. An input selector 51 is further provided to allow the user to switch between the plurality of inputs. Before inputs made to the microphone and an auxiliary connector are transferred to the processor, the inputs are converted from analog signals to digital signals by a converter 27. Although not shown, a plurality of vehicle components and auxiliary components in communication with the VCS can transmit data to the VCS (or components thereof) or receive data from the VCS (or components thereof) by using a vehicle network (for example, but not limited to, a CAN bus).

The vehicle computer system may include a microprocessor or central processing unit (CPU) communicating with many types of computer-readable storage devices or media. The computer-readable storage devices or media may include volatile and non-volatile memories such as a read-only memory (ROM), a random access memory (RAM), and a keep-alive memory (KAM). Any number of known storage devices (for example, programmable read-only memories (PROMs), EPROMs (electrically programmable read-only memories), EEPROMs (electrically erasable programmable read-only memories), flash memories, or any other electronic, magnetic, optical, or combined storage devices) may be used to implement the computer-readable storage devices or media.

The output of the system may include, but is not limited to, a visual display 4 and a speaker 13 or a stereo system output. The speaker is connected to an amplifier 11 and receives signals from the processor 3 through a digital-to-analog converter 9. The output may also be performed to a remote Bluetooth device (for example, a PND 54) or a USB device (for example, a vehicle navigation device 60) along bidirectional data flows shown at 19 and 21.

In an illustrative embodiment, the system 1 uses a Bluetooth transceiver 15 to communicate (17) with a roaming device 53 (such as a cellular phone, a smart phone, or a PDA) of the user. The roaming device 53 can then be used to communicate (59) with a network 61 external to the vehicle 31 by means of, for example, communication 55 with a base station 57. In some embodiments, the base station 57 may be a Wi-Fi access point.

The signal 14 represents exemplary communication between the roaming device and the Bluetooth transceiver.

A button 52 or similar input may be used to instruct pairing between the roaming device 53 and the Bluetooth transceiver 15. In this way, the CPU is instructed to have the on-board Bluetooth transceiver paired with a Bluetooth transceiver in the roaming device.

Data may be transmitted between the CPU 3 and the network 61 by using, for example, data plan (data-plan), data-over-voice (data over voice), or dual-tone multi-frequency (DTMF) tones associated with the roaming device 53. Alternatively, it may be required to include an on-board modem 63 having an antenna 18 for transmitting (16) data between the CPU 3 and the network 61 over a voice band. Then, the roaming device 53 can be used to communicate (59) with the network 61 external to the vehicle 31 by means of, for example, communication 55 with the base station 57. In some embodiments, the modem 63 may establish communication 20 with the base station to communicate with the network 61. As a non-limiting example, the modem 63 may be a USB cellular modem and the communication 20 may be cellular communication.

In an illustrative embodiment, the processor may be provided with an operating system including an application programming interface (API) for communication with modem application software. The modem application software may access an embedded module or firmware on the Bluetooth transceiver to complete wireless communication with a remote Bluetooth transceiver (such as that found in the roaming device). Bluetooth is a subset of the IEEE 802 PAN (personal area network) protocols. The IEEE 802 LAN (local area network) protocols include Wi-Fi and have considerable cross-functions with the IEEE 802 PAN. Both are suitable for wireless communication within a vehicle. Another communication mode that can be used in the art is free space optical communication (such as IrDA) and non-standardized consumer IR protocols.

In another embodiment, the roaming device 53 includes a modem for voice band or broadband data communication. In the data-over-voice embodiment, a technique known as frequency division multiplexing may be implemented when the owner of the roaming device talks over the device while data is being transmitted. At other times, when the owner is not using the device, the data transmission can use the whole bandwidth (300 Hz to 3.4 kHz in one example).

If the user has a data plan associated with the roaming device, the data plan may allow broadband transmission and the system may use a much wider bandwidth (accelerating data transmission). In yet another embodiment, the roaming device 53 is replaced with a cellular communication device (not shown) that is installed to the vehicle 31. In yet another embodiment, the roaming device 53 may be a wireless local area network (LAN) device capable of communication over, for example (and without limitation), an 802.11 network (such as Wi-Fi) or a WiMax network.

While frequency division multiplexing may be common for analog cellular communication between a vehicle and the Internet and is still used, it has been largely replaced by a mixture of code domain multiple access (CDMA), time domain multiple access (TDMA), and space domain multiple access (SDMA) for digital cellular communication. These are all ITU IMT-3000 (3G) compliant standards and offer a data rate up to 2 mb/s for stationary or walking users and a data rate up to 385 kb/s for users in a moving vehicle. The 3G standards are now being replaced by MT-Advanced (4G), where the MT-Advanced (4G) offers a data rate of 100 mb/s for users in a vehicle and a data rate of 1 gb/s for stationary users. Moreover, 5G communication standards that are currently being gradually adopted will increase the data transmission rate and significantly improve network capacity as compared with 4G. The communication mode involved here or in other places of the present application should be understood as including the aforementioned communication under standards such as 3G, 4G, and 5G. If the user has a data plan associated with the mobile device, the data plan may allow broadband transmission and the system may use a much wider bandwidth (accelerating data transmission). In another embodiment, the mobile device 53 is replaced with a cellular communication device (not shown) that is installed to the vehicle 31. In another embodiment, the ND 53 may be a wireless local area network (LAN) device capable of communication over, for example (and without limitation), an 802.11g network (namely, Wi-Fi) or a WiMax network.

In an embodiment, incoming data may be passed through the mobile device via data-over-voice or data plan, through the on-board Bluetooth transceiver and into the internal processor 3 of the vehicle. For example, in some cases of temporary data, the data may be stored in the HDD or another storage medium 7 until the data is no longer needed.

Other sources that may interface with the vehicle include: the personal navigation device 54 having, for example, a USB connection 56 and/or an antenna 58, the vehicle navigation device 60 having a USB 62 or other connections, the on-board GPS device 24, or a remote navigation system (not shown) connected to the network 61. The USB is one of a class of serial networking protocols. IEEE 1394 (FireWire™ (Apple), i.LINK™ (Sony) and Lynx™ (Texas Instruments)), EIA (Electronic Industries Association) Serial Protocol, IEEE 1284 (Centronics Port), S/PDIF (Sony/Philips Digital Interconnect Format), and USB-IF (USB Developer Forum) form the backbone of the device-device serial standards. Most of the protocols can be implemented for electrical communication or optical communication.

Further, the CPU may communicate with other various auxiliary devices 65. These devices may be connected via a wireless connection 67 or a wired connection 69. The auxiliary devices 65 may include, but are not limited to, a personal media player, a wireless healthcare device, a portable computer, a mobile device, a key fob, and the like.

Additionally or optionally, the CPU may be connected to a vehicle-based wireless router 73 by, for example, a Wi-Fi (IEEE 803.11) transceiver 71. This may allow the CPU to be connected to a remote network within the coverage of the local router 73.

In one or a plurality of embodiments, the roaming device 53, the personal navigation device 54, the vehicle navigation device 60, and the vehicle computer system may be installed with or invoke application software in one or a plurality of embodiments of the present application, so as to provide the trip invitation function in one or a plurality of embodiments of the present application. The vehicle computer system or other forms of personal mobile terminals may be connected to the network 61 and communicate with the server side to synchronize maps in real time. Certainly, in one or a plurality of embodiments, the aforementioned vehicle computer system or other forms of personal mobile terminals may be installed with an offline map and may implement locating using the offline map and its calculation function. In one or a plurality of embodiments, one or more of on-board device terminals such as the vehicle navigation device 60 and the vehicle computer system may be called a vehicle computer for short. In one or a plurality of embodiments, first application software may also be installed in the personal navigation device and connected to the vehicle computer in a wired or wireless (for example, Bluetooth) manner.

In addition to having exemplary procedures executed by the vehicle computer system located in the vehicle, in some embodiments, the exemplary procedures may be executed by a computer system communicating with the vehicle computer system. Such a system may include, but is not limited to, a wireless device (for example, but not limited to, a mobile phone) or a remote computer system connected through a wireless device, for example, but not limited to, the server, cloud, cloud server, or cloud platform mentioned in this context. In some embodiments, specific components determined by the specific system implementation may perform specific portions of a procedure. By way of example and not limitation, if a procedure has a step of sending or receiving information with a paired wireless device, it is likely that the wireless device does not perform the procedure, since the wireless device cannot send and receive information with itself. In all solutions, it is contemplated that at least the VCS itself located within the vehicle is capable of performing the exemplary procedures.

In one or a plurality of examples, the vehicle VCS and/or the roaming device of the user may be called a "client." The term "client" is mainly used for indicating a communication tool appropriate for initiating a ride invitation, receiving a ride invitation, initiating to request pick-up, and receiving a pick-up request in one or a plurality of embodiments of the present application. The terms "first client" and "second client" are mainly used for describing the interaction process between both parties in the embodiments. In other embodiments, the "first client" and "second client" are interchangeable. The terms "trip invitation" and "ride invitation" may be used alternately or alternatively herein to indicate an invitation for taking a ride sent or initiated by one party to the other party. In some embodiments, the trip invitation may also indicate an invitation of needing a ride or a request of needing a ride.

Figure 3:
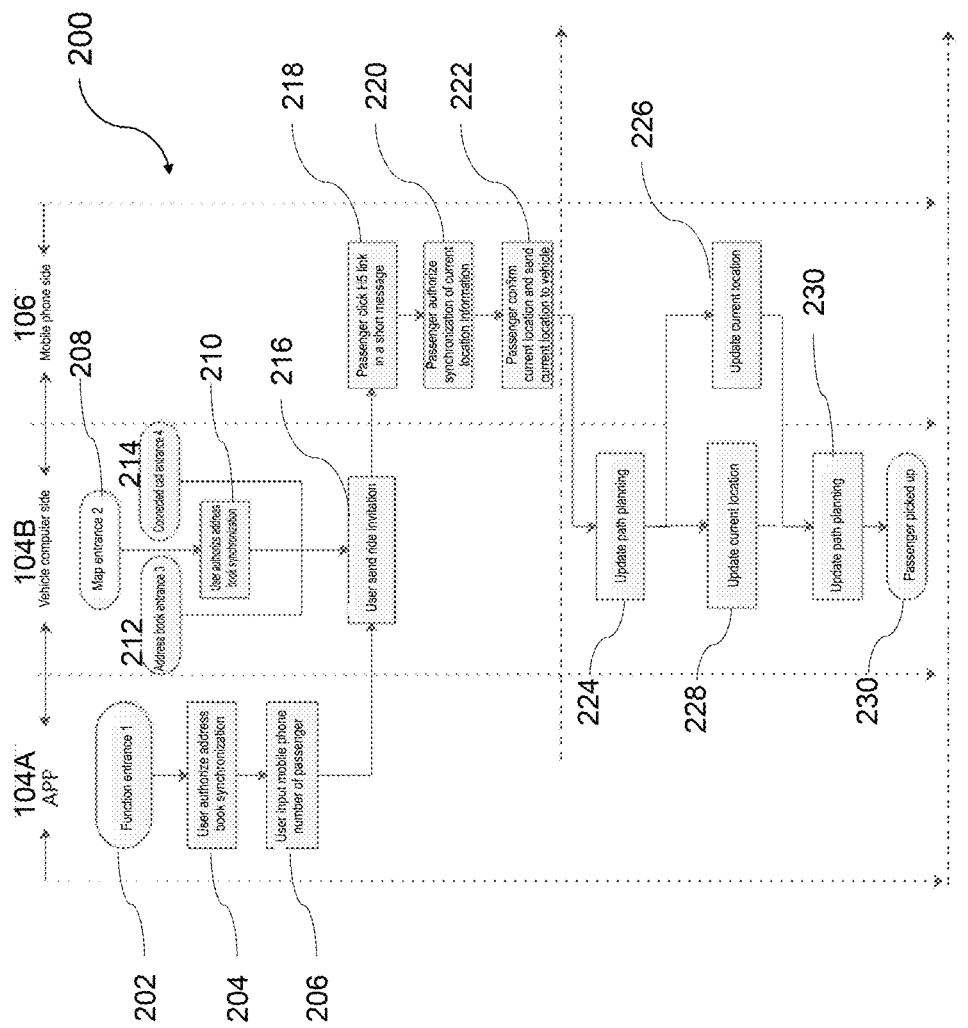
FIG. 3 shows a flowchart of an exemplary method applicable to the system for vehicle trip invitation shown in FIG. 1 according to an embodiment.

FIG. 3 shows a flowchart of an exemplary method 200 applicable to interaction between clients in the system for trip invitation shown in FIG. 1. As described in FIG. 3 and above, the first client 104 may be a mobile terminal in many forms. For example, the first client 104 may be a mobile terminal 104A in the form of a portable mobile device, or may be a computer system embedded in the vehicle or a subsequently installed vehicle mobile terminal 104B (such as the VCS or vehicle navigation device described above). The mobile terminal 104A may access the trip invitation function through a first application (for example, but not limited to FordPass) that is installed. When a mobile phone of a user is installed with the first application, the user may access the first application and find a function entrance 202. In an embodiment, after being opened, the first application displays a search page with a map in the background, and a call-to-action button is provided at an appropriate position of the page, so that the user can access the trip invitation function through a search box or the call-to-action button. The "button" above and in other places does not refer to a specific physical button, and those skilled in the art can understand the essence thereof; for example, the button may be a virtual, operable option displayed on a display/display screen. It can be understood that the virtual option may be implemented in an appropriate manner. For example, the various forms of mobile terminals may include software or applications, or instructions stored in a storage medium, where these instructions, when executed, may cause one or a plurality of processors to display the aforementioned predefined virtual option on a corresponding interface of a relevant mobile terminal. Then, the user may select whether to synchronize a mobile phone address book with the first application in step 204. When the user selects to authorize address book synchronization in step 204, in step 206, a trip invitation can be initiated by inputting a mobile phone number of a passenger, inputting a name of the passenger, or the like in a current application interface. The user input may be performed in many manners, for example, but not limited to, voice input and manual text input. When the user selects to refuse authorization for address book synchronization, the user can still make contact by inputting a mobile phone number.

In an embodiment, if the user initiates a trip invitation or a ride invitation through the vehicle mobile terminal 104B, the user may access the functional module in many manners. In an embodiment, the vehicle mobile terminal 104B may be similarly installed with the aforementioned first application (for example but not limited to FordPass), and access the invitation function in a manner similar to that above. In some other embodiments, for example, as shown in FIG. 3, in one case, a call-to-action button provided on a map entrance 208 of the navigation interface may also be used to access the trip invitation function, which will be further described below with reference to the drawings. In this case, the user may also be asked whether to authorize the ongoing application to be synchronized with the address book. Selection is made to authorize address book synchronization in step 210; then, a trip invitation can be initiated by inputting a mobile phone number of a passenger, inputting a name of the passenger, or the like in a current map interface in a manner similar to that in the embodiment described above. When the user selects to refuse authorization for address book synchronization, the user can still make contact by inputting a mobile phone number. As described above, the mobile phone number can still be input in an appropriate manner such as voice or manual manner. For the user, voice interaction can provide additional convenience. For example, the user may initiate a trip invitation by voice in the interface, and message sending may be triggered through predefined words to access the corresponding trip invitation function. Accessing the trip invitation function in the map interface can provide convenience to a vehicle driver, since personnel in the vehicle do not need to exit the current map interface to initiate contact and can directly initiate contact in the map interface and locate a pick-up location.

In an embodiment, the user may interconnect the portable mobile device, for example, 104A or other mobile devices and the vehicle computer 104B in any appropriate manner such as wired or wireless manner, so as to map some applications in the portable mobile device of the user to a display module of the vehicle computer 104B. When accessing the trip invitation function, the user may further access the function in an address book entrance 212. In an embodiment, FIG. 5 below shows that the system includes invitation option buttons or invitation options associated with address book contacts (for example, but not limited to, a contact details interface and a vehicle Bluetooth address book interface) of the first client. The option may be provided adjacent to a contact, and each address book contact corresponds to one invitation option, so as to facilitate user operation, which is as convenient as making a call.

An invitation option may be clicked by selecting an address book contact so as to trigger sending of the invitation. Those skilled in the art can understand that clicking an invitation option is just an example, and the invitation option may also be activated in other appropriate manners, for example, the option is activated by voice or gestures. In yet another example, the user may also access the function through a call interface entrance 214, and the mobile device 104A or the vehicle computer 104B may include invitation options associated with contacts of the first client in the call interface. An example of the aforementioned call interface may be an interface of an ongoing call displayed after the call is connected, where the options to end the call and put the call on hold can usually be selected. An invitation option button is added to the interface to make it more convenient for the user to initiate an invitation. Certainly, those skilled in the art can understand that the call interface may include many forms, for example, but not limited to, a vehicle Bluetooth call, a mobile phone call interface, a current call interface, and a historical call interface.

In a scenario, the passenger contacts the driver/vehicle personnel side by a call and would like the driver to pick him up at a location X. In the usual case where embodiments of the present application are not provided, the driver often wastes a lot of energy on further communication after the call to determine the precise location, and if the traffic condition changes or the passenger location changes, the pick-up process would be more energy-consuming. However, in the case with teachings of the embodiments of the present application applied, the driver may click (including triggering in other appropriate manners described above) an invitation option button in the page of a call with a specific contact so as to conveniently send a trip invitation, and further determine the geographical location to save the trouble of more communication. Certainly, when accessing the trip invitation through the address book entrance or call interface entrance, it is unnecessary to additionally ask whether to authorize address book synchronization because the step already involves the address book. Those skilled in the art can anticipate that the aforementioned entrances in the vehicle computer may also be implemented in a portable mobile device 104A of the user. The aforementioned one or plurality of entrance modes of the travel function or ride function may be used alone or in combination in different embodiments, and more or fewer function entrances may be provided as required.

Still referring to FIG. 3, in an embodiment, when the first client 104 (104A or 104B) is a vehicle personnel side, and when the vehicle personnel side (including the car owner/driver/user or the like) accesses a relevant function entrance, for example, the entrance 202, 208, 212, or 214 through the first client 104 (104A or 104B), a trip invitation or ride invitation may be further initiated in step 216. Information of the trip invitation will be sent to the second client 106, which is usually a mobile phone side. Certainly, those skilled in the art can understand that the second client 106 is also not specifically limited, and may be a mobile terminal in the form of a mobile phone or a wearable device. In an embodiment, the trip invitation is sent through a short message. The short message includes an HTML link to an electronic map. Certainly, those skilled in the art can anticipate any appropriate variations, as long as an address for accessing the map can be included or provided. In some other embodiments, the trip invitation may be sent in an appropriate manner such as WeChat, Weibo, QQ or other universal instant contact applications. In some embodiments, the first client 104 further receives a prompt of whether the trip invitation has been successfully sent.

In step 218, a user of the second client 106 may access a corresponding predefined website by clicking the html/h5 link or in other manners, so as to access a network view. The html link may be linked to a server-side online map so as to reflect the geographical location of the second client 106 on the map. It can be anticipated that in some implementations, the vehicle computer may carry a map (for example, the vehicle computer may operate as a small server), and the link may also be linked the vehicle computer map, so that the second client 106 may also directly feed back the geographical location to the vehicle computer map.

In step 220, after the user of the second client 106 clicks the link, the user may access a prompt interface so that the client can select whether to authorize synchronization of current location information to the map (for example, but not limited to, the server-side map). In step 222, the user of the second client 106 may reconfirm its location and confirm to send to the first client 104. In step 224, upon receiving confirmation of the location information, the first client 104 may update current route planning, and may select the location as a target location or select the location as a pass-by location. Certainly, if the user of the second client 106 does not need the ride service/travel service, the user may also select to refuse the trip invitation. In one or a plurality of embodiments, when the second client 106 refuses the trip invitation or does not accept the invitation over predetermined time, the first client 104 may receive a relevant prompt. In the aforementioned case that the sent trip invitation includes a link, a predetermined activation time period may also be set for the aforementioned link. That is, when the second client 106 does not accept the invitation past, for example, 3 minutes, then the aforementioned link expires. Those skilled in the art may select an appropriate prompting mode and time of link expiration according to actual demands.

In step 226, in an embodiment, the user of the second client 106 may further provide an input to require provision of a new pick-up location or setting the desired location the second client as the pick-up location. For example, the passenger of the second client 106 may hope to find a more convenient pick-up point according to the actual situation of the environment, so as to update or confirm a new pick-up location by, for example, dragging the marker on the map. In this embodiment, an inquiry option may be sent to the second client 106 on whether he/she wants/hopes/expects to relocate the pick-up location of the second client 106. The inquiry option may prevent the second client 106 from making a mistake operation or trigger. Furthermore, when the second client 106 confirms that he/she wants/hopes/expects to perform relocation, an updated passenger location of the second client 106 is relocated, and the new pick-up location of the second client 106 is further sent to the first client 104. Certainly, it can be understood that the first client 104 may or may not accept the new pick-up location suggested/sent from the second client 106. The method may further include displaying the updated new pick-up location to the first client 104 and asking whether the first client 104 accepts the new pick-up location, and when the first client 104 makes confirmation, the new pick-up location is determined as a target location or a new way point in the first client 104.

In step 228, in an embodiment, the first client 104 may also send a suggestion for an updated pick-up point, and for example, based on the actual condition and real-time situation such as the traffic condition and parking difficulty, the first client 104 may also request the second client 106 to walk to a more appropriate pick-up point. The method may further include receiving an input of the first client 104 to relocate a new pick-up location of the first client 104. In an embodiment, the method includes receiving an input of the first client 104 to send an inquiry option to the first client 104 on whether to relocate a new pick-up location of the first client 104, where the re-inquiry can avoid mis-triggering or mis-operation of the user. Further, when the first client 104 confirms relocation, a new pick-up location of the first client 104 is relocated. It can be understood that the method may further include the step of displaying the new pick-up location to the second client 106 and asking whether the second client 106 accepts the new pick-up location, and when the second client 106 makes confirmation, the new pick-up location is determined as a target location or a way point.

In step 230, as described above, the first client 104 may further update route planning based on the received new pick-up location. It can be understood that in this embodiment, the second client 106 can observe in real time the location of the first client 104, the status of the trip, and the estimated time of arrival.

In step 232, the first client 104 may pick up the second client 106 (the passenger), where the first client 104 may continue the subsequent trip based on the navigation, and the method for trip invitation is now completed.

The description of brief steps of an exemplary method in an embodiment is provided above. It can be understood that in other embodiments, one or a plurality of steps may be omitted, varied, or added to form new implementation solutions without departing from the spirit of the present invention. Schematic diagrams of operation interfaces of the first client 104 and/or the second client 106 in the aforementioned one or plurality of exemplary steps will be shown below with reference to the drawings.

Figure 4:
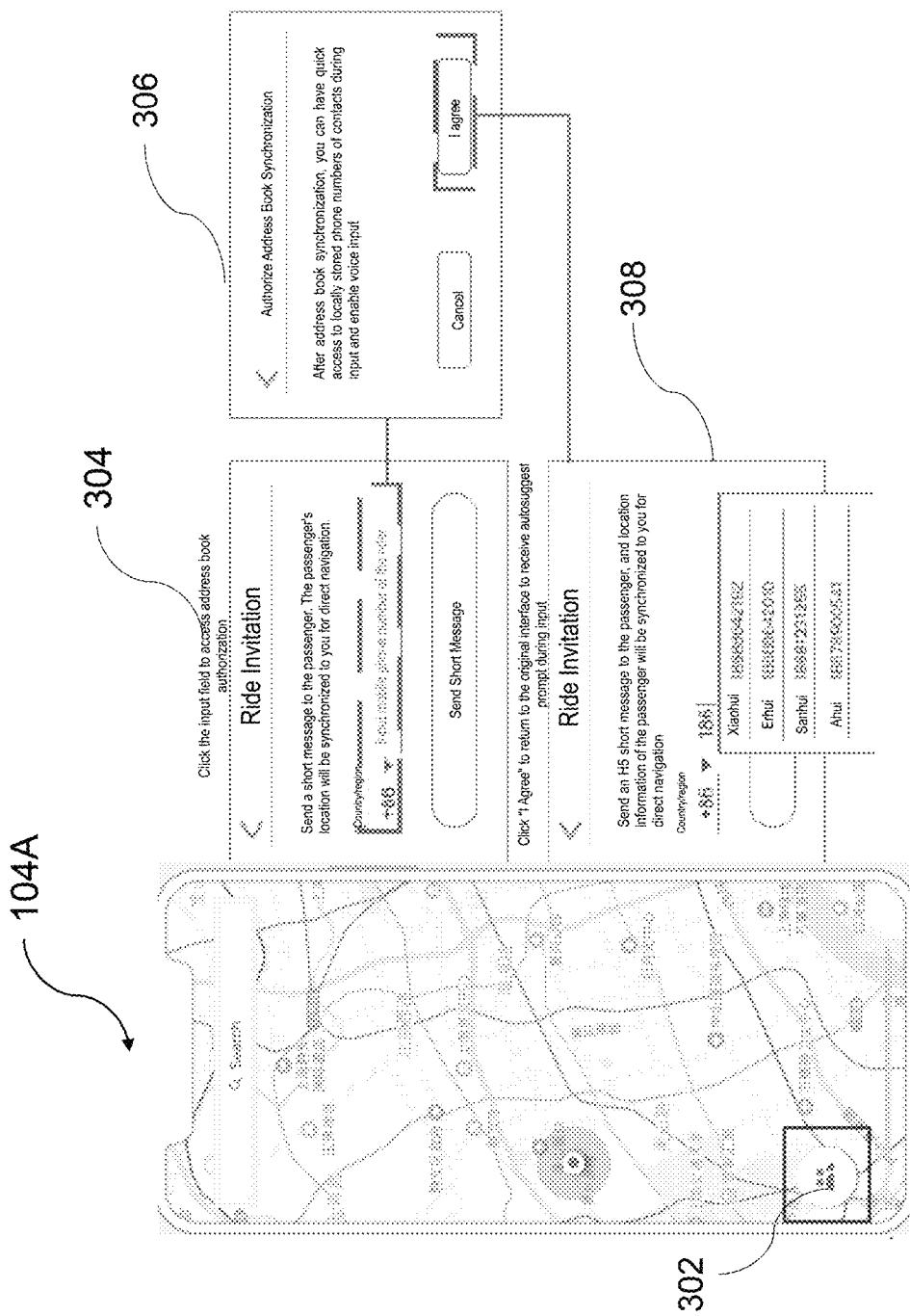
FIG. 4 shows a schematic diagram illustrating a trip invitation interface of a first client according to an embodiment.

FIG. 4 shows an interface example illustrating trip/ride invitation sending of the first client 104A in an embodiment. The interface may correspond to steps 202, 204, 206, and 216 in the exemplary method 200 described above with reference to FIG. 3. As described above, the first client 104A may be a portable mobile device of the car owner, and the first client 104A may be installed with the first application in the aforementioned embodiment, such as FordPass. The function of FordPass may be opened to access a map interface through one or a plurality of steps. In the example shown in the figure, the first application may be opened to access a search page with a map in the background, and a call-to-action button 302 is provided in the lower left corner or other appropriate positions. The button 302 may be clicked or activated in other appropriate manners to access a page 304 for ride invitation sending. As shown on the page 304, the user may input a mobile phone number to contact a specific user. Although the interface 304 displays making contact by the option "Sending Short Message," those skilled in the art can make the contact in any appropriate manner, such as contacting the second client 106 through software commonly used by the user, such as WeChat, QQ, or Weibo. Certainly, the short message mode is a more popular communication mode with wide network coverage. As prompted by the interface 306, when beginning to access an input field for editing, the user may receive a prompt of whether to synchronize with an address book, which corresponds to step 204 in the method 200, where the user may select to agree or disagree address book authorization. If the user selects the "I Agree" option, the mobile phone address book would be synchronized with the current application, such that the information of contact names and contact numbers can be displayed in the input field when sending subsequent trip invitations (as shown in 308). In subsequent interactions, ride invitations may also be edited and sent by voice. If the user disagree to synchronize the address book, subsequent operations can still be performed, but the user needs to input a mobile phone number of a rider manually or by voice. In some embodiments, if the user has previously agreed to synchronize the address book, step 306 may be skipped to directly invoke the address book.

Figure 5:
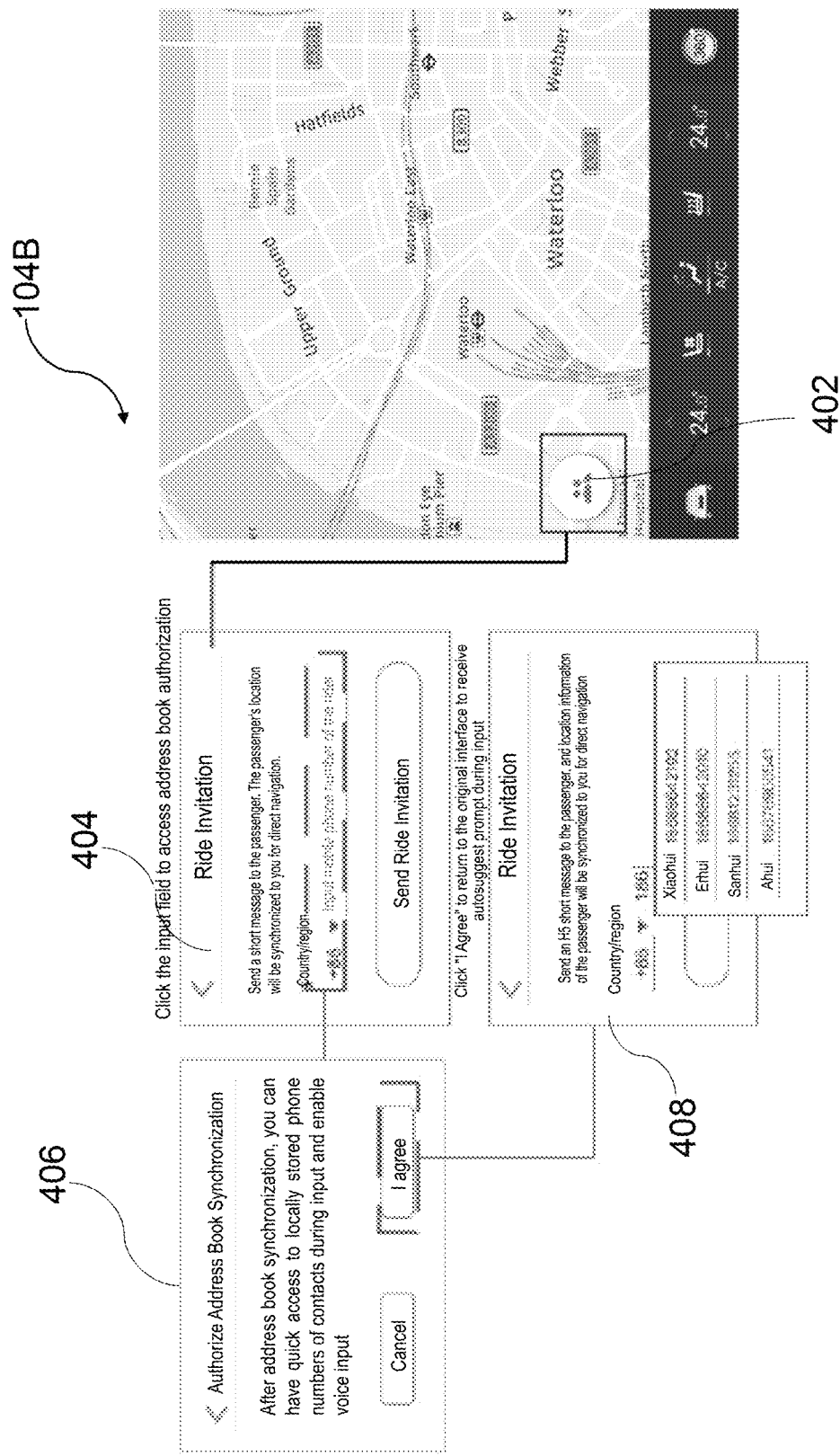
FIG. 5 shows a schematic diagram illustrating a trip invitation interface of the first client according to another embodiment.

FIG. 5 shows an interface example illustrating ride invitation sending of the first client 104B in an embodiment. The interface may correspond to steps 208, 212, 214, and 216 in the exemplary method described above with reference to FIG. 3. The first client 104B may be a vehicle computer system, which is abbreviated as VCS. The first client 104B can also be installed with the first application in the aforementioned embodiment, such as FordPass. The function of FordPass may be opened to access a map interface or trip invitation interface in a similar manner. Reference may be made to the above description with reference to FIG. 4, which will not be described herein again. In another embodiment, the first client 104B may also have a built-in offline map or map application synchronized with the server side, and may access the interface of invitation sending through a call-to-function button built in the map interface.

In the example shown in FIG. 5, the vehicle computer 104B may be opened to access a map application interface, and a call-to-action button 402 is provided on the lower left corner or other appropriate positions. The button 402 may be clicked to access a page 404 for ride invitation sending. As shown in the page 404, the user may input a mobile phone number to contact a specific user. Although the interface 304 displays making contact by the option "Send Short Message," those skilled in the art can make the contact in any appropriate manner, such as contacting the second client 106 through instant messaging software commonly used by the user, such as WeChat, QQ, or Weibo. Certainly, the short message mode is a more popular communication mode with wide network coverage. As prompted by the interface 406, when beginning to access an input field for editing, the user may receive a prompt of whether to synchronize with an address book, which corresponds to step 210 in the method 200, where the user may select to agree or disagree address book authorization. If the user selects the "I Agree" option, the mobile phone address book would be synchronized with the current application, such that the information of contact names and contact numbers can be displayed in the input field of when sending subsequent trip invitations (as shown in 408). In subsequent interactions, ride invitations may also be edited and sent by voice. If the user disagree to synchronize the address book, subsequent operations can still be performed, but the user needs to input a mobile phone number of a rider manually or by voice.

Figures 6A, 6B:
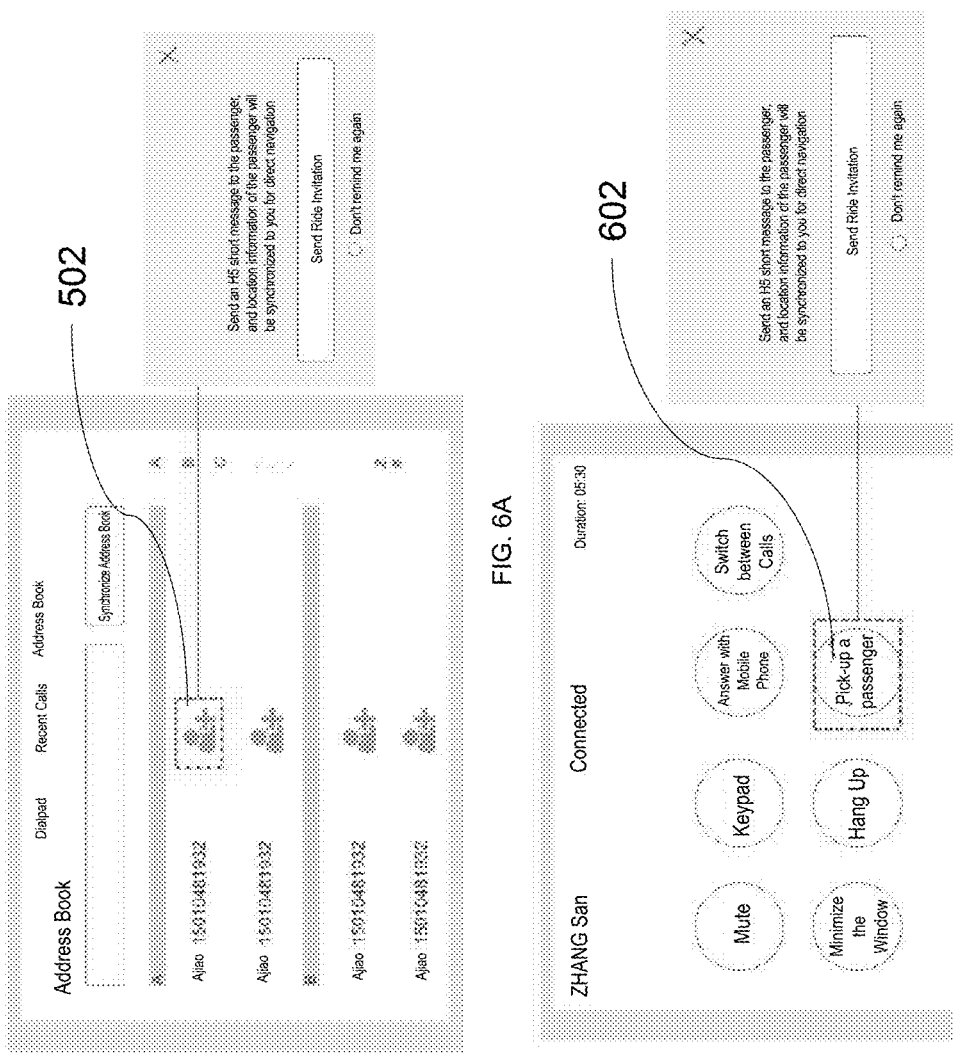
FIGS. 6A to 6B show schematic diagrams illustrating a trip invitation interface of the first client according to yet another embodiment.

FIGS. 6A and 6B show interfaces that may correspond to steps 212 and 214 in the method 200 above. In one or a plurality of embodiments, a trip invitation function entrance interface may be accessed through the address book or in a Call Connected interface. As shown in FIG. 6A, the user may access the relevant trip invitation sending function through a call-to-action button 502 (or trip invitation option) in the address book interface. As shown in FIG. 6B, the relevant invitation sending function may also be accessed through a call-to-action button 602 in the page of a call with a specific user. It can be understood that the call-to-action buttons 302, 402, 502, and 602 may be provided at any appropriate position of the page for the user's convenience, or may be displayed in any appropriate form. For example, trip invitation options/function entrances may be added to pages such as Recent Calls, Dial page, Address Book page, and Call History. The embodiment shown in the figure provides sending an invitation through a short message. As described in other places of the present application, a message may also be sent through other appropriate social software.

Figures 7, 9:
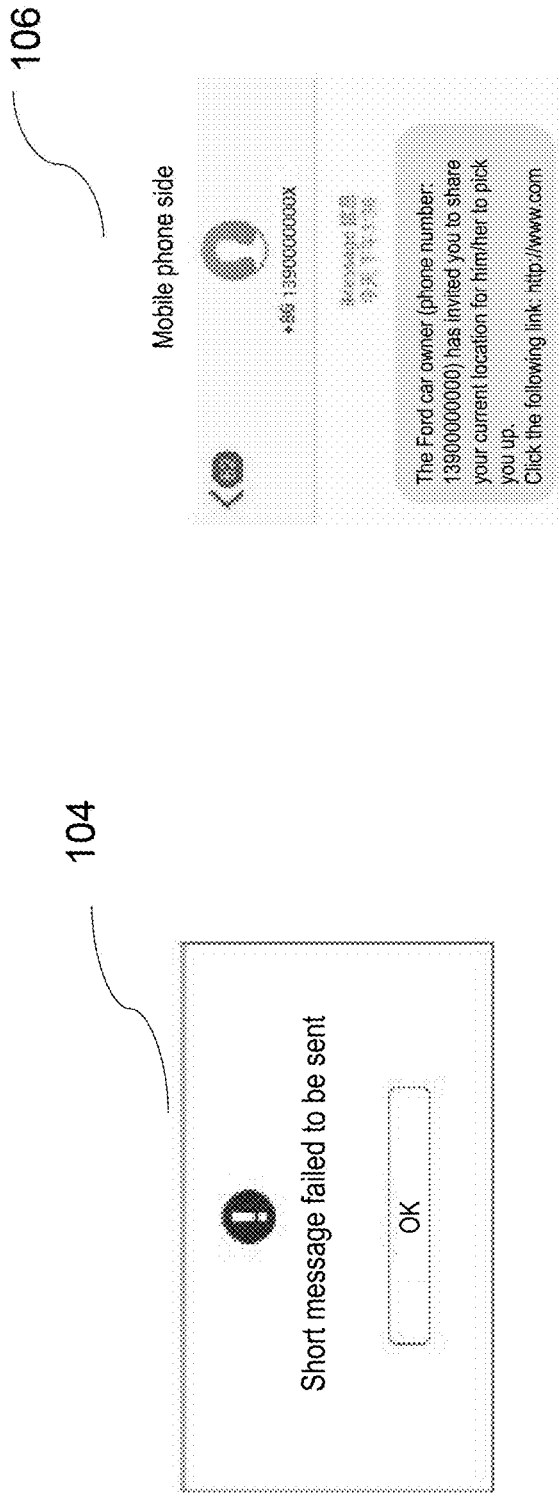
FIG. 7 shows a schematic diagram illustrating an interface of trip invitation sending failure of the first client according to an embodiment.
FIG. 9 shows a schematic diagram illustrating an interface of the trip invitation received by the second client according to an embodiment.

FIG. 7 shows a failure prompt for the initiator or the user of the first client 104 upon message sending failure of the first client 104. In some cases, reaching the contact may fail for many reasons, such as a network problem or wrong number. At this time, contact failure will be fed back to the car owner. The prompt may be made through text or voice. The prompt may include a Dismiss button or the OK button as shown in the figure so as to make sure that the user is aware of the contact failure and can decides to initiate a new invitation.

Figure 8:
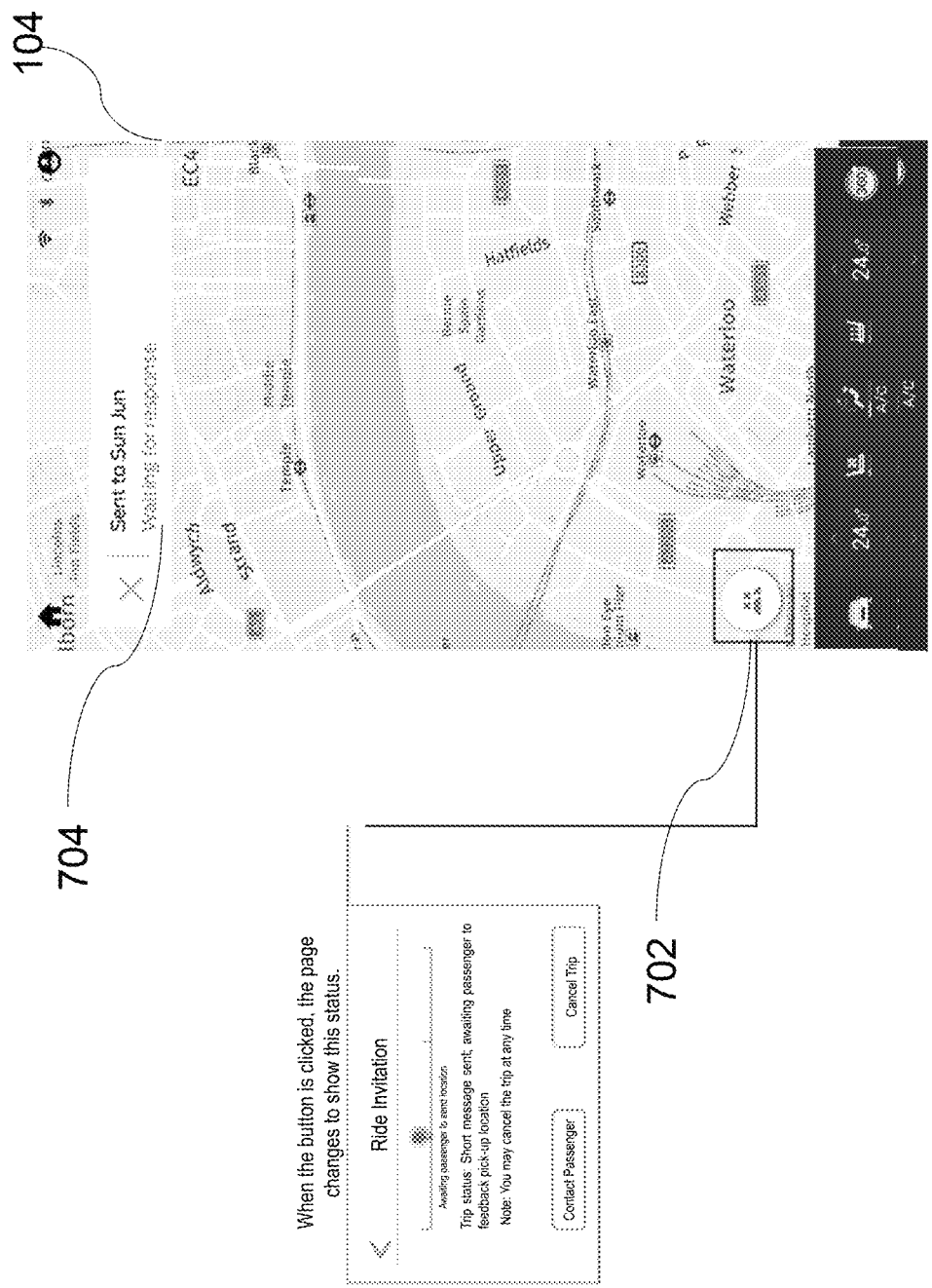
FIG. 8 shows a schematic diagram illustrating an interface of the first client waiting for feedback of a second client according to an embodiment.

FIG. 8 shows an example of a page displayed after the first client 104 successfully sends the trip invitation through, for example, a short message. As shown in the figure, after the first client 104 successfully sends the trip invitation, when the call-to-action button 702 for trip invitation is clicked again, a message prompt that the current text has been sent and a message prompt of "awaiting feedback from passenger of on pick-up location" may be displayed at a position such as 704. Certainly, those skilled in the art can understand that other forms of appropriate prompts may also exist. An example of appropriate prompts is the prompt that the message is successfully sent. Additional options may also be provided to the first client 104, such as the options to cancel the trip or contact a passenger. A progress bar may also be displayed, such as one displaying different stages, e.g., the trip has been initiated or the system is waiting for feedback from the other party. The first client 104 may also be prompted in other appropriate manners. For example, the first client 104 may be prompted by real-time notification that the second client 106 has not made any response, or that the link has expired as 3 minutes has passed, or that the trip initiation has failed. The prompt to, for example, make a call or re-send the invitation, may be provided to the user of the first client 104 for convenience.

FIG. 9 shows an embodiment of information received by the second client 106. In the embodiment shown in FIG. 9, after the first client 104 successfully sends the message, the second client 106 may receive a trip invitation which includes the following content: a phone number/name of the contact of the first client, a simple invitation message, and an HTML link to a certain URL which is a link to an electronic map. In an embodiment, the link is linked to a map stored in the server. In another embodiment, the link is linked to a map stored in the vehicle computer. Certainly, as mentioned in the above embodiment, in other embodiments, message prompts in other manners may also exist, for example, an invitation may be sent through other instant messaging software rather than a short message. In some other embodiments, for example, the first client 104 may send a request to the second client 106 to request the second client to share the location thereof, where the request may be sent in text or voice or other appropriate manners rather than in the form of a link. The second client 106 may feed back a photo, data, a network connection or the like to the first client 104 by a locating method such as taking photos, recording videos, and sending the latitude and longitude, and the location of the second client 106 is calculated through the first client 104 or the server 102. The example of directly sending information to the first client 104 is favorable to cases in which the first client 104 is using an offline map or the network is in poor condition.

Figure 10A:
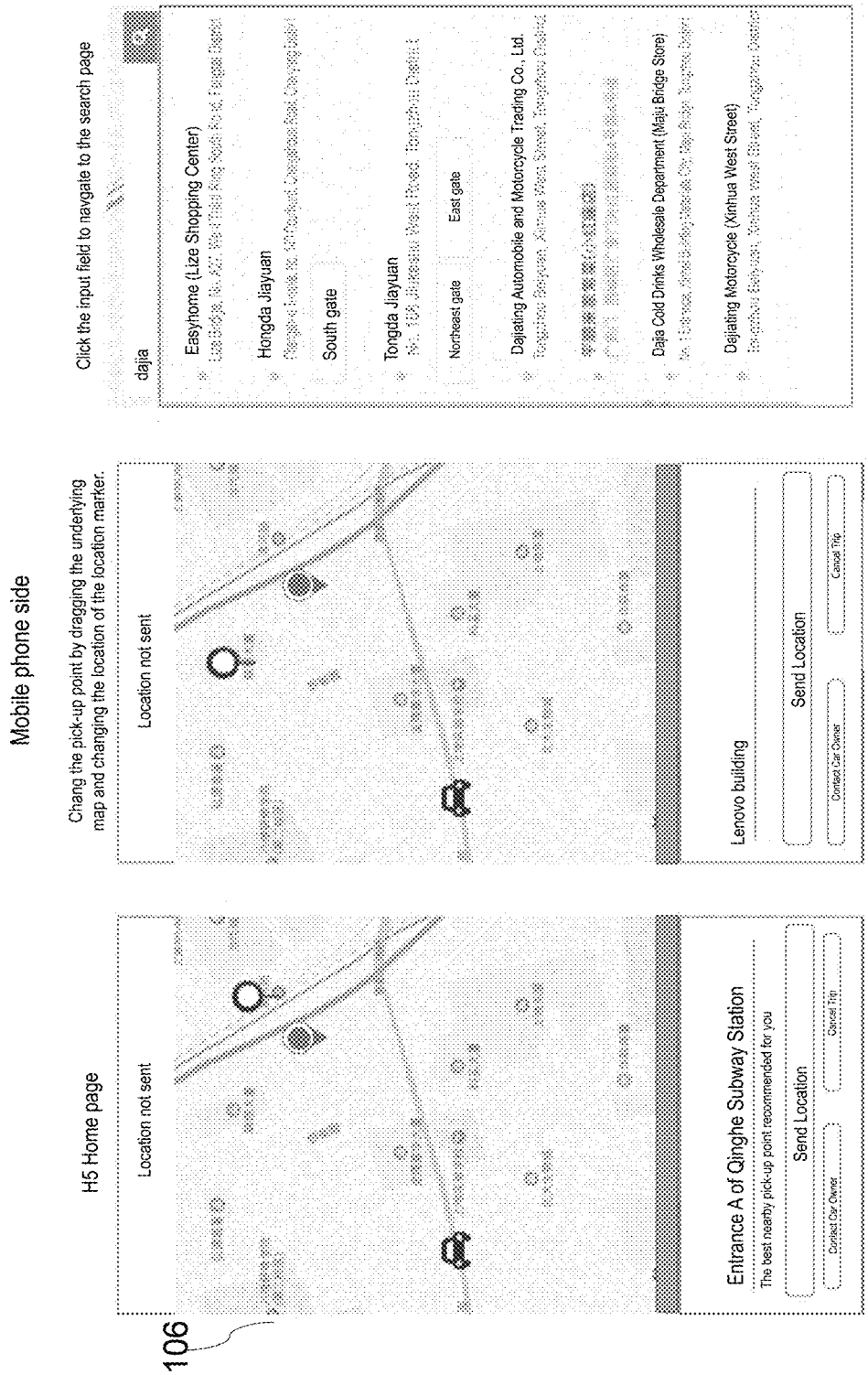
FIG. 10A shows a schematic diagram illustrating an interface of the second client accepting the trip invitation according to an embodiment.

FIG. 10A shows a schematic diagram of an interface that the second client 106 accesses when the second client 106 agrees to location sharing or authorizes location sharing upon receiving the message shown in FIG. 9 in an embodiment. After clicking the aforementioned link shown in FIG. 9, the second client 106 can access an inquiry on whether to authorize location sharing, and access a server-side map upon confirmation of the second client 106, and the location thereof is synchronously displayed on the map. The server-side map may represent an electronic map stored in any appropriate form of servers. In an embodiment, the actual location of the second client 106 may be relocated by touching a screen of the second client 106 or voice input. Certainly, the location of the second client 106 may also be located by dragging an icon or moving an underlying map. It may be confirmed through re-inquiry that the second client 106 hopes to send the location thereof to the first client 104, and the relevant location of the second client 106 displayed in the server-side map may be sent to the first client 104. In the embodiment in which the first client 104 invites the second client 106 to share the location of the second client 106 unidirectionally, the location of the first client is invisible to the second client 106. However, in this embodiment, the invitation of the first client 104 is a location mutual sharing invitation, so that after the second client 106 agrees to location sharing, the second client 106 can view the vehicle location of the inviter/trip invitation sender upon accessing a map interface. After determining the location, the second client 106 may send the location to the first client 104.

Figure 10B:
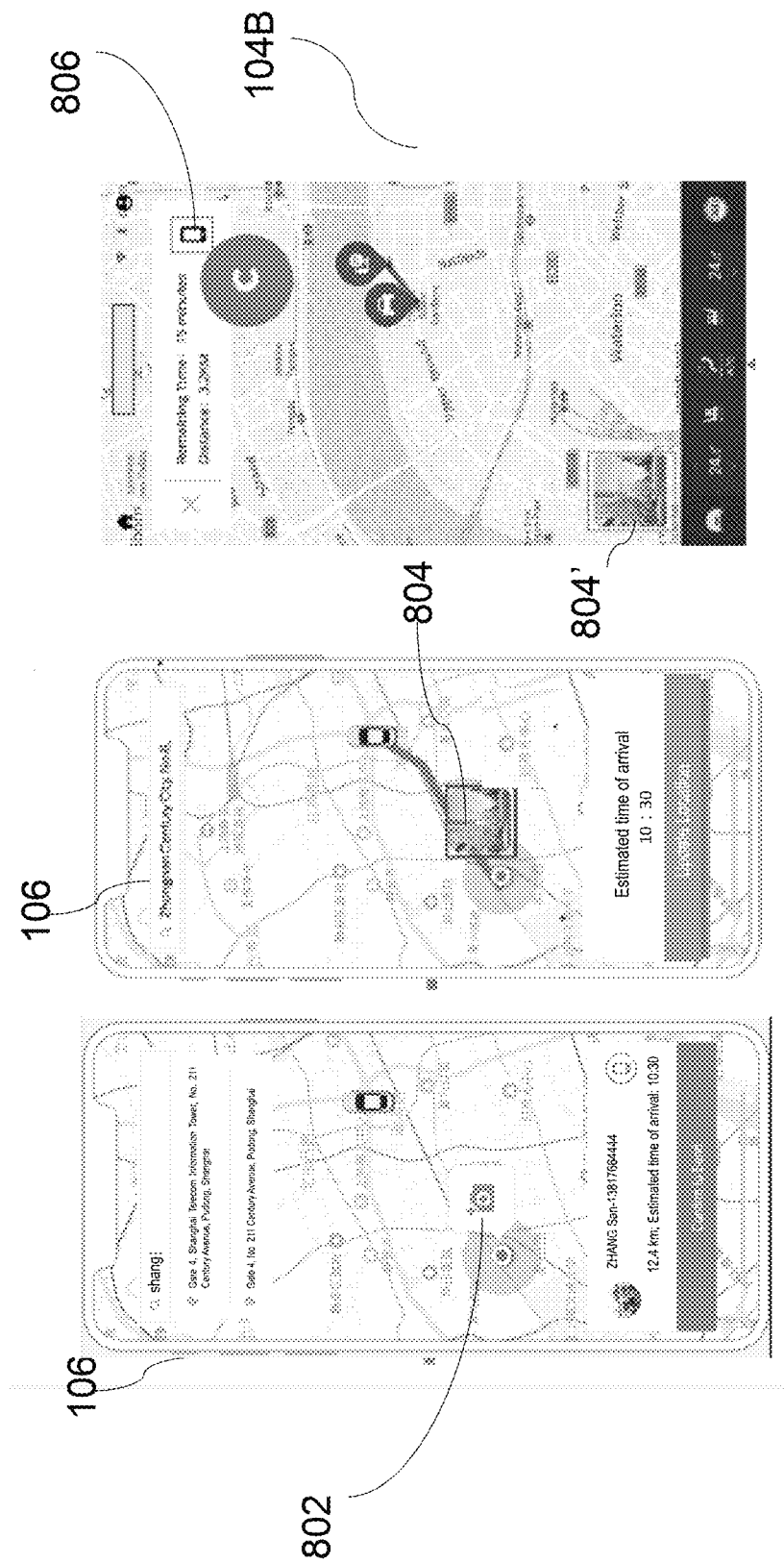
FIG. 10B shows a schematic diagram illustrating an interface of the second client accepting the trip invitation and interaction with the first client according to another embodiment.

FIG. 10B shows a schematic diagram illustrating interaction between the second client 106 and the first client 104B when the second client 106 agrees to location sharing or authorizes location sharing upon receiving the message shown in FIG. 9 in another embodiment. In this embodiment, after clicking the aforementioned link shown in FIG. 9, the second client 106 can access an inquiry on whether to authorize location sharing, and access an electronic map interface upon confirmation of the second client 106. As mentioned above and in other places of this text, the electronic map may be a map stored in the server, or a map stored in other appropriate forms. The difference from the embodiment of FIG. 10A is that in this embodiment, a photographing option 802 in the map interface is further provided in the second client 106. The photographing option 802 can further quickly help the second client 106 to photograph a street view, so as to assist the first client 104B in locating the location of the second client 106. After the user selects to use the photographing option 802, a street view photo 804 may be sent to the first client 104B, the street view photo 804 may be displayed as a small floating window in the current interface of the first client 104B, and the current interface of the second client 106 may also display a received street view photo 804'. Preferably, the street view photo 804' may be displayed in the form of a floating window at a position of the interface not interfering with navigation. In an embodiment, the photographing option 802 may be used to first send the street view at the location of the second client 106 to the server, and send the street view to the first client 104B through the server.

Further referring to FIG. 10B, in the embodiment shown in the figure, to further facilitate the communication between users, a call making shortcut 806 may be provided in the current page of the first client 104B, so that the user of the first client 104B can conveniently contact the user of the second client 106 directly. It can be understood that the aforementioned photographing option 802 and call making shortcut 806 may be located at any appropriate position of the interface. Although the first client 104B is used as an example above, it can be anticipated that the aforementioned solution can be applied to any form of first client 104 or second client 106. In some embodiments, in a ride invitation initiated by a vehicle user side, activation of the photographing option may also invoke a vehicle camera to acquire a desired pick-up point photo. The pick-up point photo may be sent to the passenger side in an appropriate manner so that the passenger can find the location of the vehicle more quickly. It can also be anticipated that the pick-up point photo may be used separately or in combination with the map to assist the passenger in finding the location of the vehicle.

Figure 11:
FIG. 11 shows a schematic diagram illustrating an interface of location sending failure of the second client according to an embodiment.

FIG. 11 shows an example of location sending failure of the second client 106. When the location fails to be sent to the first client 104 because of the network or other reasons, a prompt of location sending failure shown in FIG. 11 will be received. In other embodiments, the step of submitting location data sharing in the form of data or code may be added at this time. For example, the user may be asked whether to "send latitude and longitude data to X through a short message," and if the user agrees, location information of the second client 106 may be submitted in the form of a short message, and the first client 104 may calculate by itself the location of the second client 106. In another case, "whether to send a picture/video of the surroundings to X through the application" may be asked, so that the first client 104 can determine the location of the second client 106 by receiving the video or picture and comparing the multimedia with the real scene. The example with reference to FIG. 10B mentions the use of a photographing option to assist the first client 104 in identifying the location, while in this embodiment, a picture, a video, latitude and longitude data, and the like may also be provided separately or in combination of one or more thereof to the first client 104 so that the first client 104 can locate the second client 106. Some social software also exists in the market which allows interaction using a wireless network or Bluetooth. One or a plurality of embodiments of the present application may also be applied to such software to gain advantage. For example, in the case of poor network, the user may be asked whether to locate through Bluetooth and/or transmit the geographical location through Bluetooth. Only several possible embodiments are discussed here, and those skilled in the art can understand that the manner of sharing the geographical location is not limited to this.

Figure 12:
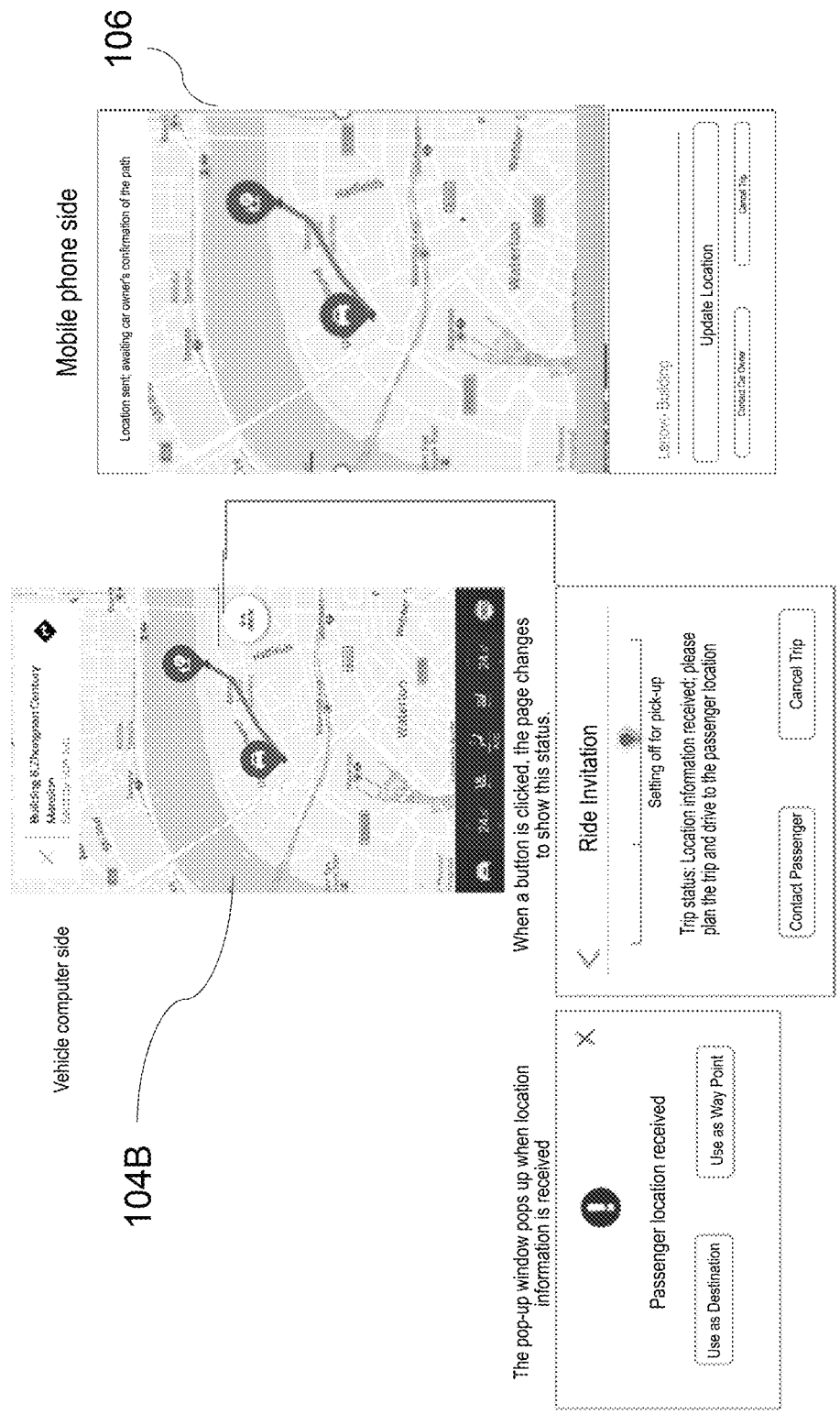
FIG. 12 shows a schematic diagram illustrating an interface of the first client receiving a location according to an embodiment.

FIG. 12 shows schematic interfaces of the first client 104B and the second client 106 after the second client 106 successfully shares the location in an embodiment. In this embodiment, as shown in the figure, the first client 104B may receive a relevant prompt of "Passenger location received" at this time. At this time, if the user of the first client 104B clicks a trip invitation button, "the trip status is Location Information Received," "please plan the trip," "pick up the passenger," or other similar message prompts will be displayed, so that the user of the first client 104B knows the progress of the current trip invitation. Certainly, the system/first client 104B may also feed back the current stage in the whole trip invitation function through a progress bar or in other appropriate forms. The first client 104B or the driver may select to use the passenger location as a destination or a way point to complete setting for navigation. Certainly, the first client 104B may also select to cancel the trip or contact the passenger. Tabs of Contact Passenger and Cancel Trip may be provided in the current interface of the first client 104B, and a quick dial option may also be provided so that the user of the first client 104 can contact a specific contact more quickly. In an embodiment, similarly, during operation of the first client 104B, the system may display a prompt that the car owner confirms the path in the second client 106, so that the second client 106 can also learn about the status, location, and so on of the first client 104B in real time. Although the first client 104B is specifically used as an example for discussion above, it can be understood that 104A or other appropriate client terminals can also perform similar setting.

Figure 13:
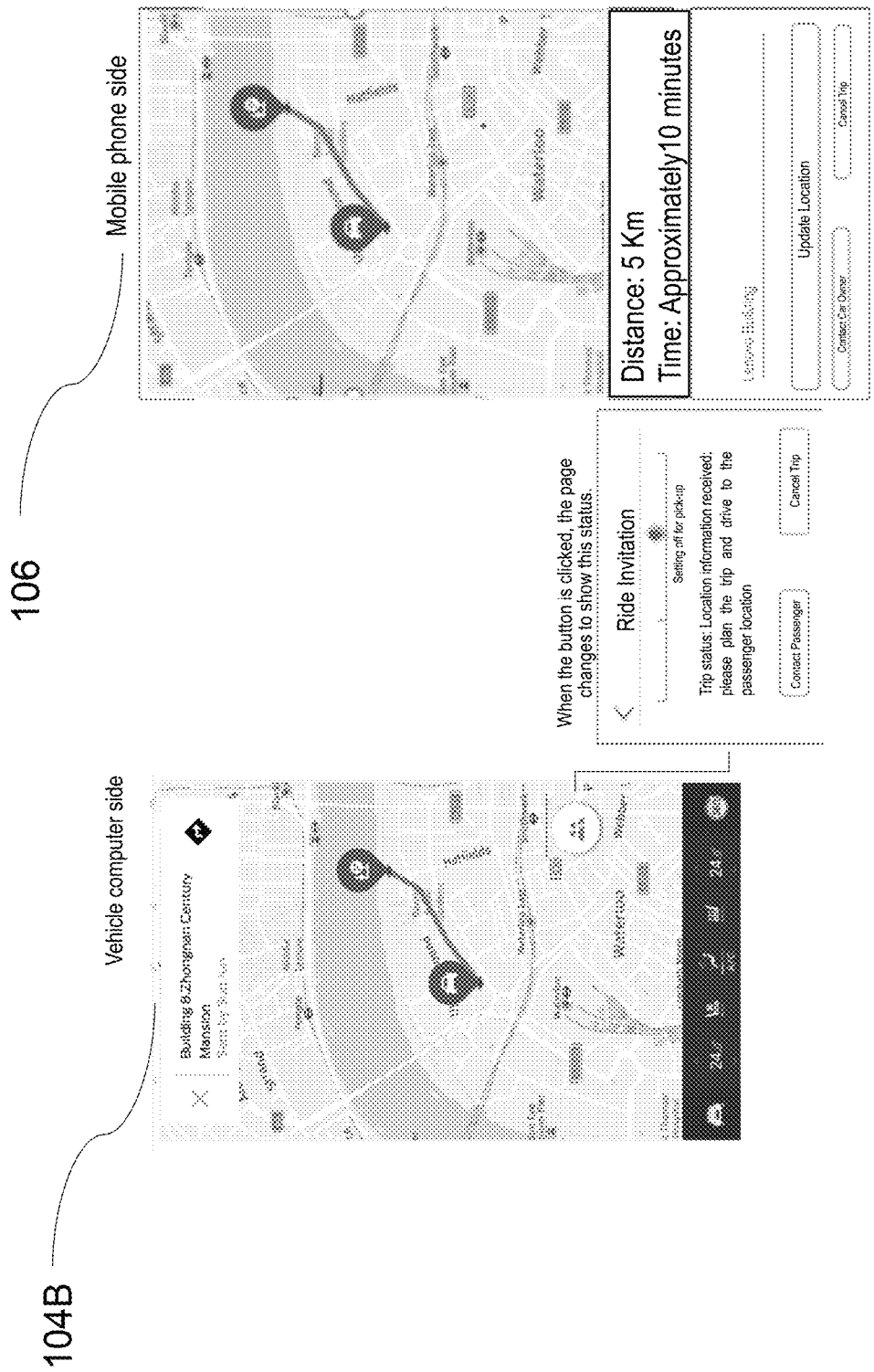
FIG. 13 shows a schematic diagram illustrating an interface of the first client planning a route after receiving the location according to an embodiment.

FIG. 13 shows interfaces of the first client 104 and the second client 106 when the first client 104 selects to use the location of the second client 106 as a way point or a destination in an embodiment. When the first client 104 selects to use the location of the second client 106 as a way point or a destination, the first client 104 may perform navigation in the current navigation interface, and navigation information and real-time location changes will be submitted to the second client 106, so that the second client 106 can learn about the location of the first client 104 in real time. As described above, in one or a plurality of embodiments, the trip invitation sent by the first client 104 may also further include requesting the second client 106 to share a geographical location thereof and a desired destination of the second client 106, and the first client 104 may set the geographical location of the second client 106 as a way point and use the desired destination of the second client 106 as a travel destination. Similarly, the first client 104 may also, according to trip needs, use both the geographical location and the destination of the second client 106 as way points for navigation, and set a desired destination of the first client 104 itself as a final destination.

Figure 14:
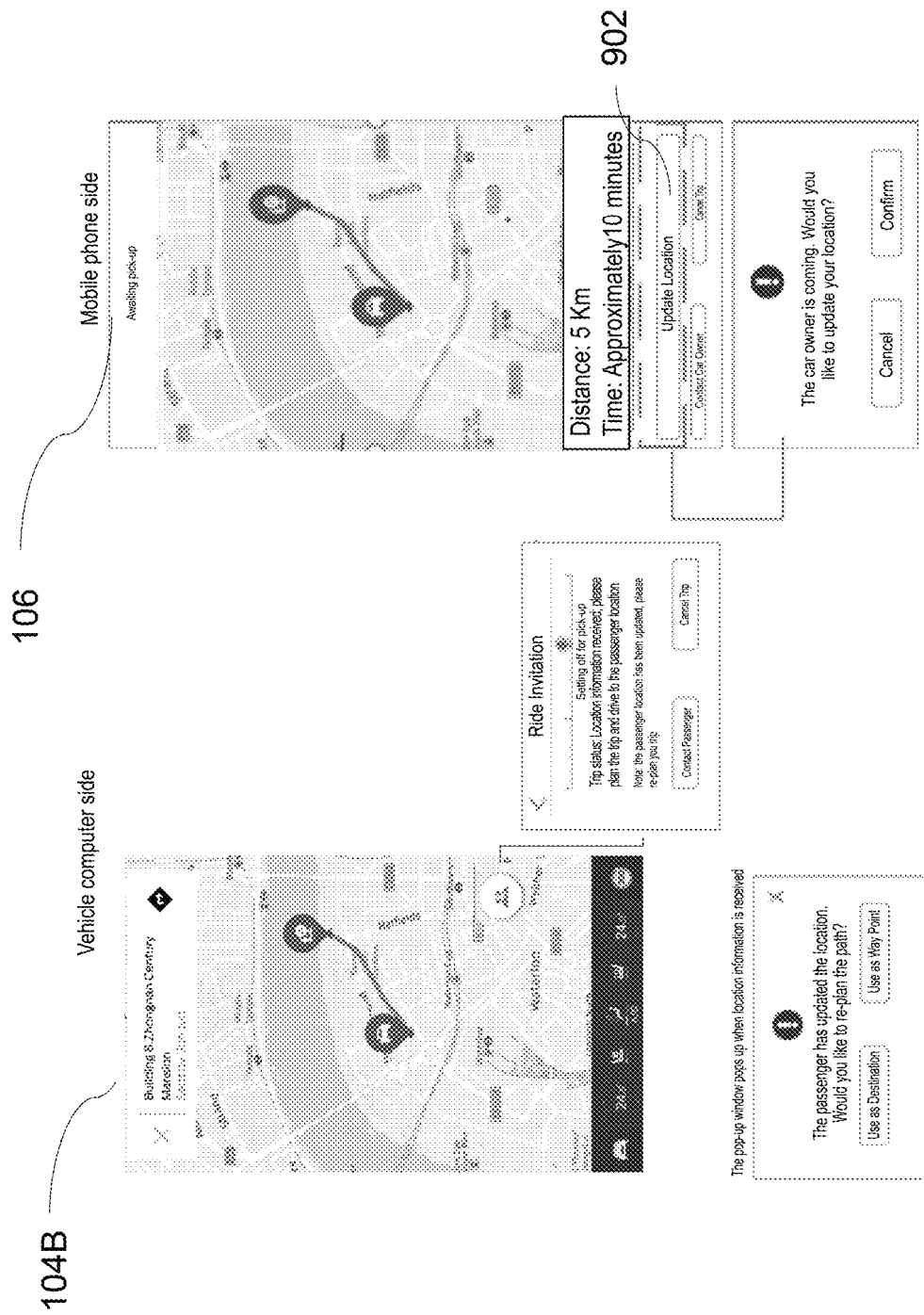
FIG. 14 shows a schematic diagram illustrating interfaces of the first client and the second client with the route updated according to an embodiment.

FIG. 14 shows an embodiment of pick-up location update initiated by the second client 106 in an embodiment. As in step 226 described above with reference to FIG. 3, the second client 106 may update the location/provide a new pick-up location by dragging a marker on the map, or may initiate location update by clicking a point in the page, or adjust the new pick-up location by moving an underlying map. As shown in the figure here, a call-to-action button/option "Update Location" 902 may be provided, and a Confirm or Cancel option on whether to relocate the pick-up location of the second client 106 may be sent to the second client 106, where the inquiry step can avoid mis-operation of the second client 106. Further, when the second client 106 confirms relocation, an updated passenger location of the second client 106 may be relocated, and the new pick-up location may be further sent to the first client 104. At this time, as shown in FIG. 14, the first client 104 has receives a prompt that the passenger has updated the location. When the prompt is displayed to the first client 104, the first client 104 may be asked whether the first client 104 accepts the update of the pick-up location, and when the first client 104 makes confirmation, the new pick-up location may be determined as the target location or a new way point. If the first client 104 does not confirm the new pick-up location, the second client will also receive a refusal prompt.

It can be understood that although not shown, the first client 104 may also select to adjust the pick-up location, and when the user or driver of the first client 104 judges that a more appropriate pick-up address needs to be appointed, or when parking is not allowed at a specific location because of traffic regulation or other reasons, the first client 104 may perform location update through a similar operation, and the second client 106 may also see in real time the location suggestion and real-time movement of the first client, thereby providing an efficient solution for a more convenient ride.

Figure 15:
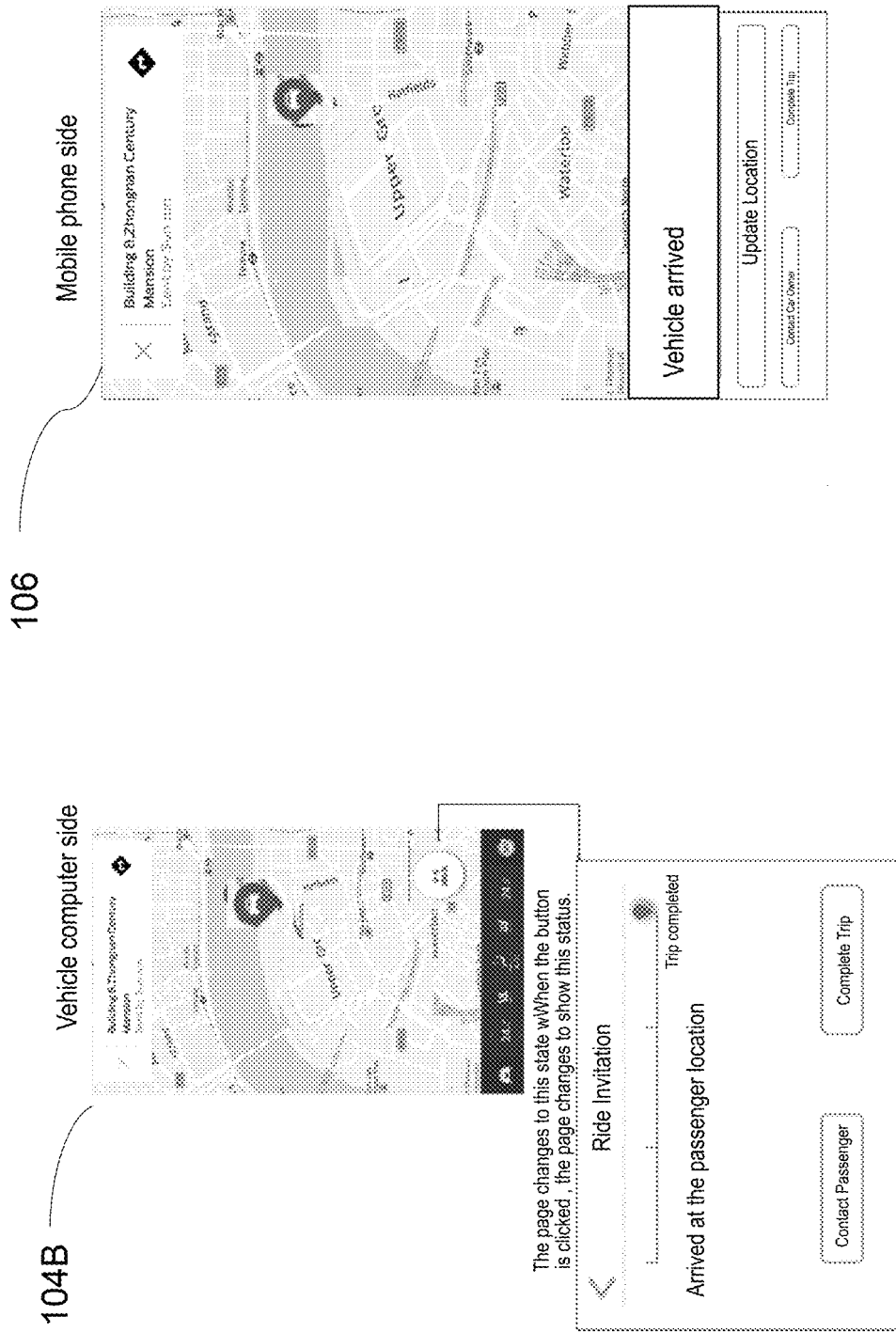
FIG. 15 shows a schematic diagram illustrating interfaces of the first client and the second client with the trip invitation completed according to an embodiment.

FIG. 15 shows completion of the trip in an embodiment. After picking up the passenger, the first client 104B may complete the trip according to the navigation, and similarly, the second client 106, namely, the passenger side, may also click to complete the trip, and the users may select appropriate manners to exit the interfaces.

The one or plurality of embodiments above involve the implementation in which a car owner picks up one specific contact. It can be understood that the car owner may also pick up more than two specific contacts in the course of the trip. The car owner may initiate a trip invitation to more than two contacts and set geographical locations shared by the more than two contacts as a way point and/or destination to complete trip planning.

The one or plurality of embodiments above discuss examples of inviting the other party for a ride. It can be understood that a specific user needing a ride may also initiate a request, for example, initiate a pick-up request to the other party. In other words, the first client may be a rider, and the second client may be a car owner or driver. As described in the aforementioned example, in the user mobile phone installed with the first application (for example, FordPass), invitation option buttons may be embedded in any contact card. For example, for an SMS contact, both "Trip Invitation" and "Pick-up Request" options/call-to-action buttons may be inserted in the contact card, and if the relevant button "Pick-up Request" is clicked, a message may be sent to a corresponding specific contact through the server. Similarly, if the contact is a WeChat contact, both "Trip Invitation" and "Pick-up Request" options may also be inserted therein. No matter which option is clicked, a WeChat message may also be sent to the contact through the cloud. The WeChat message may also similarly include inviter identification information and a link, and then feedback may be sent to the first client through the server by clicking the link and accepting the invitation. In an embodiment of inviting the other party to pick one up, once the invitation is sent, the car owner or driver may select whether to accept the invitation and may also complete the locating and pick-up process in a map page. Certainly, the party needing to be picked up may also contact the car owner by a call, so that the car owner can initiate an invitation and plan an appropriate route according to the process described in the aforementioned embodiment. When the initiator is the passenger party needing a ride, in an embodiment, upon accessing the "Pick-up Request" or similar function as in the aforementioned example, sending of request information may be triggered, where the request information may directly include a message of a geographical location of the initiator party, namely, the passenger side, to facilitate more efficient communication. The message of the geographical location may include the link described above, which may be interpreted as code, a picture, a small video, or the like of the geographical location, where one or more of them may be used separately or in combination to provide more convenient location confirmation.

Although the aforementioned embodiments mainly are mainly discussed using mobile phone address book contacts as embodiments, it can be understood that other forms of contacts and instant messaging social software, such as QQ and WeChat, can also gain advantage from using the present invention. In an embodiment, if both parties are WeChat contacts, a trip invitation may also be sent in a WeChat interface. The specific implementation may be similar to the aforementioned implementation. A first client, for example, an inviter, may send a trip invitation to a second client (for example, an invitee) through a call-to-action button providing a trip invitation, where the invitation may include a link to a server-side map, so that the first client (i.e., the inviter) can easily locate the invitee through the server-side map. Unlike the real-time location sharing function provided in WeChat, such a trip invitation does not require the inviter or the first client (car owner) to exit the current software or map interface to view the real-time location sharing in WeChat. It neither distracts the driver nor interferes with navigation software of the current application, thereby accomplishing the pick-up task conveniently. Other social software can also use the embodiments provided in the present application to gain advantage. In society where complex social software and contacts are the current norm, the inventor of the present application provides pick-up and ride services that can be accomplished without requiring usage of the same software platform in consideration of the actual demands of car owners or drivers and riders. Further, such customized demands cannot be met by commercial transaction software platforms such as Uber and DiDi. This way, one or a plurality of embodiments provide a solution supporting pick-up and drop-off services between specific subjects especially in the case of non-commercial transactions.

Although exemplary embodiments are described above, these embodiments are not intended to describe all possible forms of the present invention. Rather, the words used in the description are descriptive words rather than restrictive words, and it should be understood that various changes can be made without departing from the spirit and scope of the present invention. In addition, the features of various implementation embodiments may be combined to form further embodiments of the present invention. Various changes, modifications, and alterations can be made by those skilled in the art to these specific embodiments without departing from the essence and scope defined in the claims of the present application.

Specific combinations and sub-combinations considered as novel and non-obvious are particularly pointed out in the claims. These claims may involve "an" element or "a first" element or similar features. Such claims should be construed as including one or a plurality of such elements, neither requiring nor excluding two or more of such elements. Other combinations and sub-combinations of the described features, functions, elements and/or characteristics may be claimed by modifications on the current claims or by proposal in the present application or related applications. Such claims, whether they be broader than, narrower than, equivalent to, or different from the original claims, should be regarded as included within the subject matter of the present application.

The invention claimed is:

1. An apparatus applicable for trip invitation, comprising:
   a computer-readable storage medium having executable instructions, and a processor communicating with the computer-readable storage medium, wherein the executable instructions are configured to, when executed, cause the processor to perform the following steps:
   acquire a user input;
   display a trip invitation option in a map interface of a first application, wherein the first application is a rideshare application;
   synchronize address book contacts to the first application in response to receiving user authorization;

send a trip invitation to a specific contact included in the address book contacts through a short message or another form of instant messaging according to the specific contact selected by a user, wherein the trip invitation comprises identification information of the user and a geographical location sharing request directed to the specific contact, wherein the geographical location sharing request comprises a network link to a server-side map at a server, and wherein the geographic location sharing request comprises a text request to the first application, and a geographical location feedback comprises at least one component from the group consisting of a picture and latitude and longitude data when the first application is using an offline map;

receive a photo sent by the specific contact, wherein the photo includes a street view of a location of the specific contact;

activate the network link to give the specific contact access to the server-side map without requiring access to a rideshare application, wherein the server-side map shows a location of the user and a navigational path between the user and the specific contact; and display the photo in a floating window at a position of the map interface of a first client.

2. The apparatus according to claim 1, wherein the steps comprise displaying a trip invitation option associated with the address book contacts in the apparatus.

3. The apparatus according to claim 1, wherein the steps further comprise displaying in a call interface a trip invitation option associated with the specific contact.

4. The apparatus according to claim 1, wherein the steps comprise:

not synchronizing address book contacts to the first application in response to receiving the user's refusal to authorize address book synchronization; and responsive to not synchronizing the address book contacts to the first application, sending the trip invitation directed to the specific contact through the user inputting a contact number.

5. The apparatus according to claim 1, wherein the steps comprise displaying a quick call option in the map interface of the first application.

6. The apparatus according to claim 1, wherein the first client is a vehicle personnel portable mobile terminal or a vehicle computer terminal.

7. The apparatus according to claim 1, wherein the steps comprise:

planning a route based on the geographical location.

8. The apparatus according to claim 1, wherein the trip invitation is a ride invitation or a pick-up request directed to the specific contact.

9. A method for trip invitation, comprising:

displaying a trip invitation option in a map interface of a first application, wherein the first application is a rideshare application;

synchronize address book contacts to the first application in response to receiving user authorization from a user;

sending a trip invitation to a specific contact included in the address book contacts through a short message or another form of instant messaging according to the specific contact selected by a user, wherein the trip invitation comprises a geographical location sharing request directed to the specific contact, wherein the geographical location sharing request comprises a link to an electronic map, and wherein the geographic location sharing request comprises a text request to the first application, and a geographical location feedback comprises at least one component from the group consisting of a picture and latitude and longitude data in response to when the first application using an offline map;

receiving a photo sent by the specific contact, wherein the photo includes a street view of a location of the specific contact;

receiving feedback of the specific contact through the first application, wherein in response to the specific contact accepting the trip invitation by activating the link without requiring access to a particular rideshare application, the electronic map is displayed to the specific contact and the user, wherein the electronic map comprises a geographical location of the user and a navigational path between the geographical location of the user and a geographical location of the specific contact; and displaying the photo in a floating window at a position of the map interface of a first client.

10. The method according to claim 9, wherein the method comprises sending the geographical location of the specific contact to the first application in the form of a marker on the map.

11. The method according to claim 9, wherein the method comprises synchronizing the geographical location to the server in the form of a marker on the map and further sending the geographical location to the first application.

12. A device comprising a navigation application, comprising:

a computer-readable storage medium having executable instructions, and a processor communicating with the computer-readable storage medium, wherein the executable instructions are configured to, when executed, cause the processor to perform the following step:

acquiring an input of a user in a navigation interface of the navigation application, wherein the navigation application is a rideshare application;

display a trip invitation option in the navigation interface;

synchronize address book contacts to the navigation application in response to receiving user authorization;

sending a trip invitation to a specific contact included in the address book contacts through a short message or another form of instant messaging according to the specific contact selected by the user, wherein the trip invitation comprises identification information of the user and a geographical location sharing request directed to the specific contact, wherein the geographical location sharing request comprises a network link to a server-side map, and wherein the geographic location sharing request comprises a text request to the navigation application, and a geographical location feedback comprises at least one component from the group consisting of a picture and latitude and longitude data when the navigation application is using an offline;

receive a photo sent by the specific contact, wherein the photo includes a street view of a location of the specific contact;

activate the network link to give the specific contact access to the server-side map without requiring access to a particular rideshare application, wherein the server-side map shows a location of the user and a navigational path between the user and the specific contact; and display the photo in a floating window at a position of the map interface of a first client.

13. The device according to claim 12, wherein the step comprises not synchronizing address book contacts to the navigation application in response to receiving the user's refusal to authorize address book synchronization, and sending the trip invitation directed to the specific contact through the user inputting a contact number responsive to not synchronizing the address book contacts to the navigation application.

* * * * *